United States Patent
Buekenhoudt et al.

(10) Patent No.: US 10,322,377 B2
(45) Date of Patent: Jun. 18, 2019

(54) METHOD FOR INCREASING THE FOULING RESISTANCE OF INORGANIC MEMBRANES BY GRAFTING WITH ORGANIC MOIETIES

(71) Applicants: VITO NV, Mol (BE); UNIVERSITEIT ANTWERPEN, Antwerp (BE)

(72) Inventors: Anita Buekenhoudt, Geel (BE); Kenny Wyns, Lommel (BE); Ghulam Mustafa, Mol (BE); Vera Meynen, Geel (BE)

(73) Assignees: Vito NV, Mol (BE); Universiteit Antwerpen, Antwerp (BE)

( * ) Notice: Subject to any disclaimer, the term of this patent is extended or adjusted under 35 U.S.C. 154(b) by 188 days.

(21) Appl. No.: 15/120,484

(22) PCT Filed: Feb. 24, 2015

(86) PCT No.: PCT/EP2015/053772
§ 371 (c)(1),
(2) Date: Aug. 19, 2016

(87) PCT Pub. No.: WO2015/124784
PCT Pub. Date: Aug. 27, 2015

(65) Prior Publication Data
US 2017/0065936 A1 Mar. 9, 2017

(30) Foreign Application Priority Data
Feb. 24, 2014 (EP) ..................... 14156401

(51) Int. Cl.
*B01D 65/08* (2006.01)
*B01D 61/02* (2006.01)
*B01D 67/00* (2006.01)
*B01D 69/14* (2006.01)
(Continued)

(52) U.S. Cl.
CPC ........... *B01D 65/08* (2013.01); *B01D 61/027* (2013.01); *B01D 67/0079* (2013.01); *B01D 67/0093* (2013.01); *B01D 69/148* (2013.01); *B01D 71/024* (2013.01); *C02F 1/44* (2013.01);
(Continued)

(58) Field of Classification Search
None
See application file for complete search history.

(56) References Cited

U.S. PATENT DOCUMENTS

| | | | |
|---|---|---|---|
| 5,209,838 | A | 5/1993 | Sleppy et al. |
| 2007/0148415 | A1 | 6/2007 | Ku et al. |
| 2007/0191499 | A1 | 8/2007 | Chmelka et al. |

FOREIGN PATENT DOCUMENTS

| | | | |
|---|---|---|---|
| EP | | 2055226 A1 | 5/2009 |
| WO | WO 2008/112745 A1 | | 9/2008 |
| WO | WO 2010/106167 A1 | | 9/2010 |

OTHER PUBLICATIONS

Castro et al., "The permeability behavior of polyvinylpyrrolidonemodified porous silica membranes," *Journal of Membrane Science*, vol. 84, pp. 151-160 (1993).

*Primary Examiner* — Chester T Barry
(74) *Attorney, Agent, or Firm* — Knobbe, Martens, Olson & Bear, LLP

(57) ABSTRACT

Provided herein are filtration membranes for water treatment, and methods for preventing fouling of such membranes. The method described herein comprises grafting the membrane surface with an organic moiety, by reacting the surface with an organometallic reagent, a phosphonate, a phosphinate, or an organosilane.

17 Claims, 5 Drawing Sheets

(51) Int. Cl.
*B01D 71/02* (2006.01)
*C02F 1/44* (2006.01)
(52) U.S. Cl.
CPC .......... *C02F 1/442* (2013.01); *B01D 2323/38* (2013.01); *C02F 1/444* (2013.01); *C02F 2303/20* (2013.01)

METHOD FOR INCREASING THE FOULING RESISTANCE OF INORGANIC MEMBRANES BY GRAFTING WITH ORGANIC MOIETIES

FIELD OF THE INVENTION

The present application relates to the field of filtration membranes, more particularly ceramic membranes for water purification, and to methods for preventing or diminishing fouling of such membranes.

BACKGROUND OF THE INVENTION

Availability of clean water is a growing world-wide challenge. Consequently, development of efficient water purification, desalination and recycling technologies is an important topic on the world-wide research agenda.

Membrane filtration is considered a very powerful purification technology to tackle this problem. The majority of the membranes used for water filtration have long been polymeric membranes. However, more recently also ceramic membranes are finding their way into this field. The main benefits of ceramic membranes are their high chemical and thermal stability enabling chemical and/or thermal regeneration and sterilization by aggressive chemicals and/or hot steam. Moreover, their high mechanical stability enables high pressure back-flushing. As a consequence, despite their higher cost, ceramic membranes are becoming an economically feasible alternative for polymeric membranes in water treatment.

A critical issue in the development of effective membrane processes (both for polymeric and ceramic membranes) is the decline in system performance due to membrane fouling. This limits the economic efficiency of the operation and slows down large scale industrial applications of membranes especially in case of fouling caused by the adsorption of dissolved matter onto the membrane surface and/or into the membrane pores. This type of fouling is considered irreversible fouling and can generally only be removed by chemical cleaning.

Membrane fouling can be decreased by optimization of feed pre-treatment (e.g. via ultrafiltration, microfiltration, flocculation, ozonation and/or UV oxidation), and regular physical and chemical cleaning. Additional measures involve a careful selection of membrane, module design, and operating parameters.

A more sustainable approach is the prevention of the undesired adsorption processes by membrane-surface modification. Although poorly understood, it is generally accepted that fouling of polymeric membranes in water treatment decreases with an increase in hydrophilicity of the membrane material. Consequently, research has been performed to increase polymer membrane hydrophilicity by grafting, plasma or other surface treatment.

Ceramic membranes, and particularly silicon and/or metal oxide and hydroxide membranes, generally are intrinsically hydrophilic and consistently show relative low fouling in water treatment. Nevertheless, also these membranes become less effective over time due to fouling.

Grafting of ceramic materials with phosphonic acids is known to result in stable modified metal oxide surfaces (Mutin et al.; *J. Mater. Chem.* 2005, 15, 3761). International patent application WO 2010/106167 describes another stable grafting of organic functional moieties onto the surface of ceramic membranes in order to increase the membrane hydrophobicity or change its affinity.

SUMMARY OF THE INVENTION

The present inventors surprisingly found that by grafting silicon or metal oxide and/or hydroxide membranes with certain organic moieties, the sensitivity of the membranes to fouling decreases significantly, while maintaining sufficient hydrophilicity.

Thus, provided herein is a method for reducing the sensitivity of a membrane comprising an oxide and/or hydroxide of silicon or a metal to fouling and/or protecting a membrane against fouling comprising grafting the surface of said oxide and/or hydroxide with an organic moiety $R^1$ or $R^{10}$ by contacting said surface with an organometallic reagent, a phosphonate, a phosphinate, or an organosilane.

The method is further characterized in that $R^1$ is selected from the group consisting of $C_{1-12}$alkyl, $C_{6-10}$aryl, $C_{7-16}$alkylaryl, $C_{7-16}$arylalkyl, $-R^7[OR^8]_nR^9$, $C_{3-8}$cycloalkyl, $C_{3-8}$cycloalkenyl, $C_{4-10}$cycloalkylalkyl, $C_{4-10}$cycloalkenylalkyl, $C_{2-12}$alkenyl, 3- to 8-membered heterocyclyl, 5- to 10-membered heteroaryl, heterocyclyl$C_{1-6}$alkyl, heteroaryl$C_{1-4}$alkyl and $C_{2-12}$alkynyl; wherein $R^7$ and $R^8$ are independently from each other $C_{1-4}$alkylene; n is an integer from 1 to 4; and $R^9$ is $C_{1-4}$ alkyl; and $R^{10}$ is selected from the group consisting of $C_{1-8}$ alkylene, $C_{6-10}$arylene, $C_{7-16}$alkylarylene, $C_{7-16}$arylalkylene, $-R^{11}[OR^{12}]_mR^{13}-$, $C_{3-8}$cycloalkylene, $C_{3-8}$cycloalkenylene, $C_{4-10}$cycloalkylalkylene, $C_{4-10}$cycloalkenylalkylene, $C_{2-12}$alkenylene, 3- to 8-membered heterocyclylene, 5- to 10-membered heteroarylene, heterocyclyl$C_{1-6}$alkylene, heteroaryl$C_{1-4}$alkylene and $C_{2-12}$alkynylene; wherein $R^{11}$, $R^{12}$, and $R^{13}$ are independently from each other $C_{1-4}$alkylene, and m is an integer from 1 to 4;

wherein $R^1$ and $R^{10}$ are optionally substituted with one or more groups independently selected from hydroxyl, $-OR^4$, amino, halo, sulfhydryl, $-SR^5$, $-COOH$, and $-COOR^6$; wherein $R^4$, $R^5$, $R^6$ are independently selected from $C_{1-6}$alkyl, halo and $C_{6-10}$aryl.

In particular embodiments, the membrane comprises an oxide and/or hydroxide of an element $M^1$, and said surface of said inorganic matrix is grafted with an organic functional group $R^1$, via a direct $M^1$-$R^1$ bond; at least one $M^1$-O—P—$R^1$ bond; a $M^1$-O—Si—$R^1$ bond; a $M^1$-O—P—$R^{10}$—P—O-$M^1$ bond; or a $M^1$-O—Si—$R^{10}$—Si—O-$M^1$ bond; wherein $M^1$ is a metal or silicon; and $R^1$ and $R^{10}$ have the same meaning as defined above.

In certain embodiments, the organometallic reagent is a compound of the formula $R^1$-$M^2$, or of formula $R^1$-$M^2$-X, or of formula $R^1$-$M^2$-$R^{1'}$; wherein $M^2$ is Li or Mg, and X is halo; $R^1$ has the same meaning as defined above; and $R^{1'}$ is, the same or different from $R^1$, selected from the group consisting of $C_{1-12}$alkyl, $C_{6-10}$aryl, $C_{7-16}$alkylaryl, $C_{7-16}$arylalkyl, $-R^7[OR^8]_nR^9$, $C_{3-8}$cycloalkyl, $C_{3-8}$cycloalkenyl, $C_{4-10}$cycloalkylalkyl, $C_{4-10}$cycloalkenylalkyl, $C_{2-12}$alkenyl, 3- to 8-membered heterocyclyl, 5- to 10-membered heteroaryl, heterocyclyl$C_{1-6}$alkyl, heteroaryl$C_{1-4}$alkyl and $C_{2-12}$alkynyl; optionally substituted with one or more groups independently selected from hydroxyl, $-OR^4$, amino, halo, sulfhydryl, $-SR^5$, $-COOH$, and $-COOR^6$; wherein $R^4$, $R^5$, $R^6$ are independently selected from $C_{1-6}$alkyl, halo and $C_{6-10}$aryl; $R^7$ and $R^8$ are independently from each other $C_{1-4}$alkylene; n is an integer from 1 to 4; and $R^9$ is $C_{1-4}$ alkyl.

In particular embodiments, the phosphonate or phosphinate is a compound chosen from
formula (I)

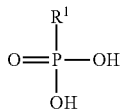

or a salt or ester thereof, wherein $R^1$ has the same meaning as defined above;
or
formula (III)

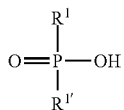

or a salt or ester thereof, wherein
$R^1$ has the same meaning as defined above; and
$R^{1'}$ is, the same or different from $R^1$, selected from the group consisting of $C_{1\text{-}12}$alkyl, $C_{6\text{-}10}$aryl, $C_{7\text{-}16}$alkylaryl, $C_{7\text{-}16}$arylalkyl, —$R^7[OR^8]_nR^9$, $C_{3\text{-}8}$cycloalkyl, $C_{3\text{-}8}$cycloalkenyl, $C_{4\text{-}10}$cycloalkylalkyl, $C_{4\text{-}10}$cycloalkenylalkyl, $C_{2\text{-}12}$alkenyl, 3- to 8-membered heterocyclyl, 5- to 10-membered heteroaryl, heterocyclyl$C_{1\text{-}6}$alkyl, heteroaryl$C_{1\text{-}4}$alkyl and $C_{2\text{-}12}$alkynyl; optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1\text{-}6}$alkyl, halo and $C_{6\text{-}10}$aryl; $R^7$ and $R^8$ are independently from each other $C_{1\text{-}4}$alkylene; n is an integer from 1 to 4; and $R^9$ is $C_{1\text{-}4}$ alkyl;
or
formula (IV)

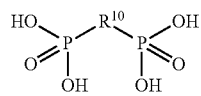

or a salt or ester thereof, wherein $R^{10}$ has the same meaning as defined above.

In certain embodiments, $R^1$ is $C_{1\text{-}6}$alkyl, phenyl, or —$R^7[OR^8]_nR^9$; wherein $R^7$ and $R^8$ are independently from each other $C_{1\text{-}4}$alkylene; n is an integer from 1 to 4; and $R^9$ is $C_{1\text{-}4}$ alkyl.

In particular embodiments, the membrane is a water treatment membrane. In certain embodiments, the method is for protecting the membrane from fouling when used for water treatment.

In certain embodiments, $R^1$ is $C_{1\text{-}6}$alkyl or phenyl; and $R^{10}$ is $C_{1\text{-}6}$alkylene or phenylene.

The membranes described herein are particularly suitable and stable for use in filtration in that the grafting with one or more organic moieties prevents or significantly reduces fouling of the membranes, compared to the non-grafted filtration membranes. The hydrophilicity of the grafted membranes is nevertheless still sufficient to allow an effective use of the membranes for water filtration. Moreover, the grafted membranes are typically easier to clean, compared to the non-grafted membranes. Thus, the membranes are particularly suitable for use in water filtration.

Accordingly, the application further provides the use of a functionalized inorganic matrix comprising an oxide and/or hydroxide of an element $M^1$ for water treatment or water purification, characterized in that the surface of said inorganic matrix is grafted with an organic functional group $R^1$ or $R^{10}$, wherein,
$M^1$ is a metal or silicon;
$R^1$ is selected from the group consisting of $C_{1\text{-}12}$alkyl, $C_{6\text{-}10}$aryl, $C_{7\text{-}16}$alkylaryl, $C_{7\text{-}16}$arylalkyl, —$R^7[OR^8]_nR^9$, $C_{3\text{-}8}$cycloalkyl, $C_{3\text{-}8}$cycloalkenyl, $C_{4\text{-}10}$cycloalkylalkyl, $C_{4\text{-}10}$cycloalkenylalkyl, $C_{2\text{-}12}$alkenyl, 3- to 8-membered heterocyclyl, 5- to 10-membered heteroaryl, heterocyclyl$C_{1\text{-}6}$alkyl, heteroaryl$C_{1\text{-}4}$alkyl and $C_{2\text{-}12}$alkynyl; wherein $R^7$ and $R^8$ are independently from each other $C_{1\text{-}4}$alkylene; n is an integer from 1 to 4; and
$R^9$ is $C_{1\text{-}4}$ alkyl;
and
$R^{10}$ is selected from the group consisting of $C_{1\text{-}8}$ alkylene, $C_{6\text{-}10}$arylene, $C_{7\text{-}16}$alkylarylene, $C_{7\text{-}16}$arylalkylene, —$R^{11}[OR^{12}]_mR^{13}$—, $C_{3\text{-}8}$cycloalkylene, $C_{3\text{-}8}$cycloalkenylene, $C_{4\text{-}10}$cycloalkylalkylene, $C_{4\text{-}10}$cycloalkenylalkylene, $C_{2\text{-}12}$alkenylene, 3- to 8-membered heterocyclylene, 5- to 10-membered heteroarylene, heterocyclyl$C_{1\text{-}6}$alkylene, heteroaryl$C_{1\text{-}4}$alkylene and $C_{2\text{-}12}$alkynylene; wherein $R^{11}$, $R^{12}$, and $R^{13}$ are independently from each other $C_{1\text{-}4}$alkylene;
wherein $R^1$ and $R^{10}$ are optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1\text{-}6}$alkyl, halo and $C_{6\text{-}10}$aryl, and m is an integer from 1 to 4.

In certain embodiments of the present use, $R^1$ or $R^{10}$ is grafted on said surface via a direct $M^1$-$R^1$ bond; at least one $M^1$—O—P—$R^1$ bond; a $M^1$-O—Si—$R^1$ bond; a $M^1$-O—P—$R^{10}$—P—O-$M^1$ bond; or a $M^1$-O—Si—$R^{10}$—Si—O-$M^1$ bond.

In particular embodiments of the use, $M^1$ is selected from the group consisting of titanium, zirconium, aluminium, silicon, strontium, yttrium, lanthanum, hafnium, thorium, iron, manganese, or combinations thereof.

In certain embodiments of the use, the oxide and/or hydroxide of $M^1$ is titanium oxide or zirconium oxide.

In particular embodiments of the use, $R^1$ is $C_{1\text{-}6}$alkyl, phenyl, or —$R^7[OR^8]_nR^9$; optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1\text{-}6}$alkyl, halo and $C_{6\text{-}10}$aryl; $R^7$ and $R^8$ are independently from each other $C_{1\text{-}4}$alkylene; and n is an integer from 1 to 4.

In particular embodiments of the use, the functionalized inorganic matrix is a membrane comprising a support made of inorganic material coated with at least one separating membrane layer made of the oxide and/or hydroxide of $M^1$ at the surface.

In certain embodiments of the use, the oxide and/or hydroxide of $M^1$ is provided as particles in a mixed matrix membrane.

In certain embodiments, the membranes are porous with an average pore size of 0.5 nm to 200 nm.

The above and other characteristics, features and advantages of the concepts described herein will become apparent from the following detailed description, which illustrates, by way of example, the claimed methods and uses herein.

BRIEF DESCRIPTION OF THE DRAWINGS

The following description of the figures of specific embodiments is merely exemplary in nature and is not intended to limit the present teachings, their application or uses. Throughout the drawings, corresponding reference numerals indicate like or corresponding parts and features.

B: Graph illustrating the fouling tendency of grafted and native titania NF membranes using laminarin gum as a model foulant, in concentrations 0.1, 0.25 and 0.5 mg/L.

C: Graph illustrating the fouling tendency of grafted and native titania NF membranes using meat peptone as a model foulant, in concentrations 5, 15 and 25 mg/L.

D: Graph illustrating the fouling tendency of grafted and native titania NF membranes using wood extracts as a model foulant.

Figure 2:
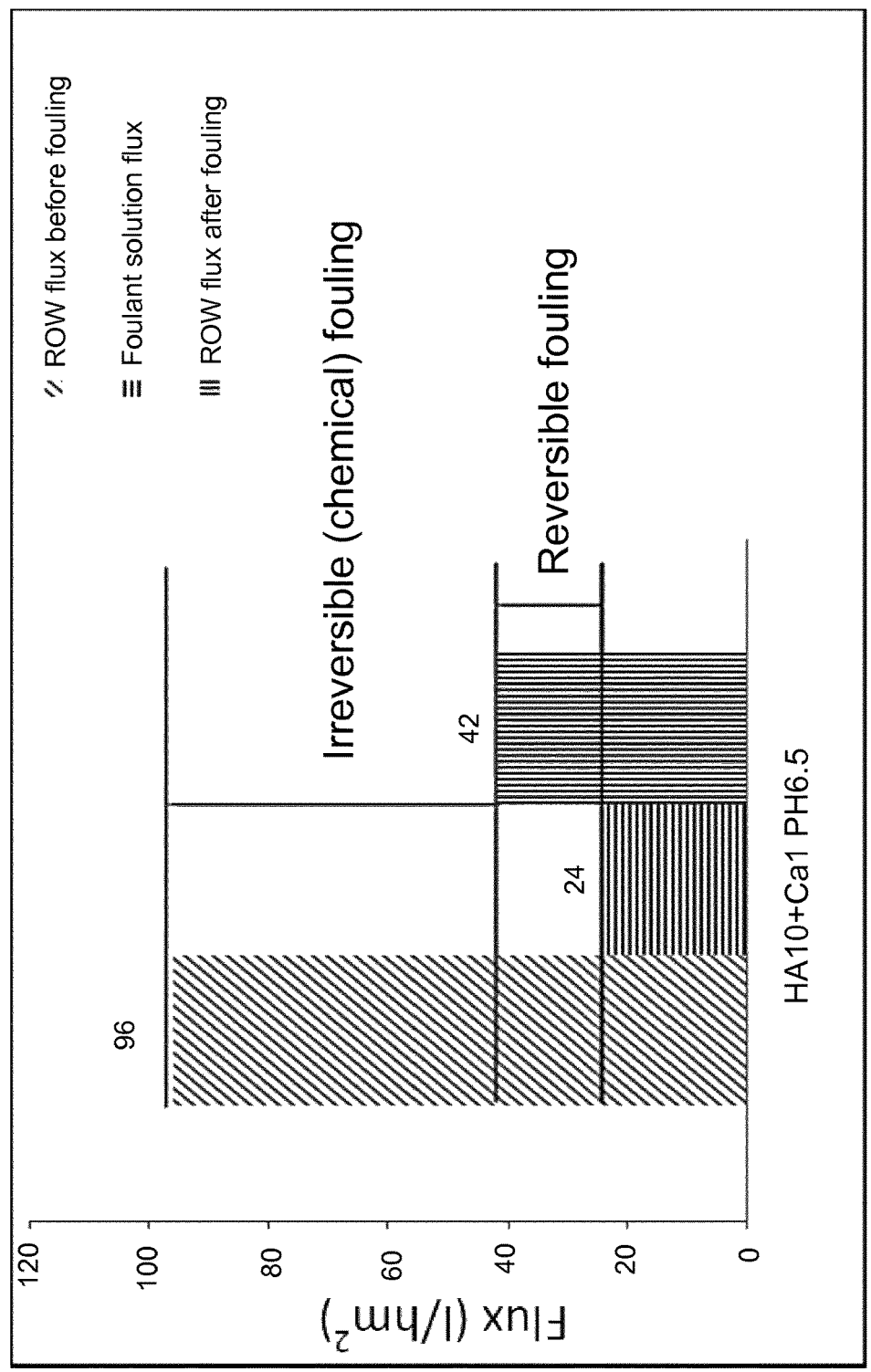

FIG. 2: Graph illustrating the reverse osmosis water (ROW) flux through a membrane before fouling, the foulant solution flux and the ROW flux after fouling. Horizontal hatching: foulant solution flux. Italic hatching: ROW flux before fouling. Vertical hatching: ROW flux after fouling.

DETAILED DESCRIPTION OF THE INVENTION

While potentially serving as a guide for understanding, any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited components, elements or method steps also include embodiments which "consist of" said recited components, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments described herein are capable of operation in other sequences than described or illustrated herein.

The values as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to ensure one or more of the technical effects envisaged herein. It is to be understood that each value as used herein is itself also specifically, and preferably, disclosed.

The recitation of numerical ranges by endpoints includes all numbers and fractions subsumed within the respective ranges, as well as the recited endpoints.

Reference throughout this specification to "one embodiment" or "an embodiment" means that a particular feature, structure or characteristic described in connection with the embodiment is included in at least one embodiment envisaged herein. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are also envisaged herein, and form different embodiments, as would be understood by those in the art. For example, in the appended claims, any of the features of the claimed embodiments can be used in any combination.

All documents cited in the present specification are hereby incorporated by reference in their entirety.

Unless otherwise defined, all terms used in disclosing the concepts described herein, including technical and scientific terms, have the meaning as commonly understood by one of ordinary skill in the art. By means of further guidance, definitions for the terms used in the description are included to better appreciate the teaching of the present disclosure. The terms or definitions used herein are provided solely to aid in the understanding of the teachings provided herein.

In a first aspect, the present application provides a method for protecting a membrane comprising an oxide and/or hydroxide of silicon or a metal against fouling.

The term "fouling" as used herein refers to the blocking and/or plugging of membrane pores during a filtration process, in a way that degrades the membrane's performance, e.g. by a severe decline of the flux. The term fouling as used herein includes irreversible fouling due to organic foulants such as humics, oils, and/or polyelectrolytes. The term "irreversible fouling" refers to the strong attachment of foulants, which cannot be removed by physical cleaning.

More specifically, the present application provides a method for reducing the sensitivity of a membrane comprising an oxide and/or hydroxide of silicon or a metal to fouling, in particular irreversible fouling.

In particular embodiments, the present method allows for reducing the irreversible fouling of an inorganic membrane by at least 30%, compared to the membrane prior to grafting with $R^1$ as described herein, preferably a least 50%. The amount of irreversible fouling can be measured by calculating the decline of the water flux under normal filtration conditions, after fouling (without chemical cleaning) (see e.g. FIG. 2).

The present method for protecting a membrane against fouling comprises grafting the surface of the oxide and/or hydroxide with an organic moiety. The expression "surface" as used herein is understood to comprise the (macroscopic) outer surface as well as the inner pore surfaces of a matrix. The surface to which an organic functional group is adhered may thus be an external surface and/or an internal surface of the matrix.

The resulting membranes are significantly less sensitive to fouling, and may be used for the treatment or filtration of various compositions, including but not limited to aqueous compositions.

The methods envisaged herein are particularly suitable for protecting membranes used in water treatment or purification against fouling. Indeed it has been found that grafting the surface of an oxide and/or hydroxide with an organic moiety ensures that the membranes are significantly less sensitive to typical foulants of water. Thus, the membranes described herein are of particular interest for the treatment or purification of aqueous compositions. Accordingly, in a further aspect, the present application provides in the use of a functionalized inorganic matrix comprising an oxide and/or hydroxide of a metal and/or silicon for water treatment, characterized in that the surface of said inorganic matrix is grafted with an organic functional group, more particularly the organic functional groups envisaged herein and defined as $R^1$ or $R^{10}$. Optionally, the inorganic matrix may further be grafted with an organic functional group $R^{1'}$. In certain embodiments however, the inorganic matrix is not grafted with an organic functional group other than $R^1$ and/or $R^{10}$.

The method envisaged herein involves modification or functionalization of a matrix. The terms "modification" and "functionalization" are used interchangeably herein and both refer to the covalent bonding of organic group(s), also defined herein as $R^1$ or $R^{10}$, or in particular embodiments $R^1$ and/or $R^{1'}$ moieties, onto a surface of a matrix as defined herein. As will be detailed below, the covalent bonding of a group $R^1$ to a matrix, which is an oxide or hydroxide of a metal $M^1$, may be direct (via a $M^1$-C bond) or indirect (via a $M^1$-O—P—C or $M^1$-O—Si—C bond). In this context the terms "modified" or "surface-modified" or "functionalized" matrix should also be considered as synonyms and refer to a matrix as defined herein, having organic compound(s) attached to their surface, including the surface of the pores within the matrix where applicable, via covalent binding.

The inventors have found that to obtain an optimal flux and antifouling properties, the functional groups $R^1$, $R^{1'}$, and/or $R^{10}$ are preferably not too bulky. Indeed, the inventors have observed that optimal anti-fouling properties are obtained when $R^1$ is a group such as methyl or phenyl. It has however been found that this anti-foulant property can similarly be obtained with organic moieties the organic moiety $R^1$ and $R^{10}$ as defined herein below. In particular embodiments, $R^1$ and (if present) $R^{1'}$ are independently selected from the list consisting of $C_{1-12}$alkyl, $C_{6-10}$aryl, $C_{7-16}$alkylaryl, $C_{7-16}$arylalkyl, —$R^7[OR^8]_nR^9$, $C_{3-8}$cycloalkyl, $C_{3-8}$cycloalkenyl, $C_{4-10}$cycloalkylalkyl, $C_{4-18}$cycloalkenylalkyl, $C_{2-12}$alkenyl, 3- to 8-membered heterocyclyl, 5- to 10-membered heteroaryl, heterocyclyl$C_{1-6}$alkyl, heteroaryl$C_{1-4}$alkyl and $C_{2-12}$alkynyl;
wherein $R^7$ and $R^8$ are independently from each other $C_{1-4}$alkylene; n is an integer from 1 to 4; and $R^9$ is $C_{1-4}$ alkyl.

In certain embodiments, $R^{10}$ is selected from the group consisting of $C_{1-8}$alkylene, $C_{6-10}$arylene, $C_{7-16}$alkylarylene, $C_{7-16}$arylalkylene, —$R^{11}[OR^{12}]_mR^{13}$—, $C_{3-8}$cycloalkylene, $C_{3-8}$cycloalkenylene, $C_{4-10}$cycloalkylalkylene, $C_{4-10}$cycloalkenylalkylene, $C_{2-12}$alkenylene, 3- to 8-membered heterocyclene, 5- to 10-membered heteroarylene, heterocyclyl$C_{1-6}$alkylene, heteroaryl$C_{1-4}$alkylene and $C_{2-12}$alkynylene; wherein $R^{11}$, $R^{12}$ and $R^{13}$ are independently from each other $C_{1-4}$alkylene;

As indicated above, in certain embodiments, the inorganic matrix may further be grafted with an organic functional group $R^{1'}$. It is envisaged that $R^{1'}$, if present, is an organic moiety independently selected from the list consisting of $C_{1-12}$alkyl, $C_{6-10}$aryl, $C_{7-16}$alkylaryl, $C_{7-16}$arylalkyl, —$R^7$[$OR^8$]$_nR^9$, $C_{3-8}$cycloalkyl, $C_{3-8}$cycloalkenyl, $C_{4-10}$cycloalkylalkyl, $C_{4-10}$cycloalkenylalkyl, $C_{2-12}$alkenyl, 3- to 8-membered heterocyclyl, 5- to 10-membered heteroaryl, heterocyclyl$C_{1-6}$alkyl, heteoaryl$C_{1-4}$alkyl and $C_{2-12}$alkynyl;

In the embodiments envisaged herein, $R^1$, $R^{1'}$ (if present), and $R^{10}$ are optionally substituted. The term "substituted" is used in the context of the methods described herein, to indicate that one or more hydrogens on the moiety indicated in the expression using "substituted" is replaced with a selection from the indicated group, provided that the indicated atom's normal valency is not exceeded, and that the substitution results in a chemically stable compound, i.e. a compound that is sufficiently robust to survive isolation to a useful degree of purity from a reaction mixture.

More particularly, as envisaged herein, $R^1$, $R^{1'}$ (if present), and $R^{10}$ are optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1-6}$alkyl, halo and $C_{6-10}$aryl, and m is an integer from 1 to 4.

In particular embodiments, $R^1$ is $C_{1-12}$alkyl. In further embodiments, $R^1$ is $C_{1-8}$alkyl, more particularly $C_{1-6}$alkyl. In yet further embodiments, $R^1$ is $C_{1-4}$alkyl. The term "alkyl" by itself or as part of another substituent, refers to a straight or branched saturated hydrocarbon group joined by single carbon-carbon bonds. When a subscript is used herein following a carbon atom, the subscript refers to the number of carbon atoms that the named group may contain. Thus, for example, "$C_{1-4}$alkyl" means an alkyl of one to four carbon atoms. Examples of $C_{1-4}$alkyl groups are methyl, ethyl, propyl, isopropyl, butyl, isobutyl and tert-butyl.

In particular embodiments, $R^1$ is an ether or oligoether of formula —$R^7[OR^8]_nR^9$, wherein $R^7$ and $R^8$ are independently from each other $C_{1-4}$alkylene; n is an integer from 1 to 4; and $R^9$ is $C_{1-4}$ alkyl. The bond to the parent moiety is through $R^7$. In further embodiments, $R^7$ and $R^8$ are independently from each other $C_{1-3}$alkylene; n is an integer from 1 to 3; and $R^9$ is $C_{1-3}$ alkyl.

As used herein, the term "$C_{1-x}$alkylene", by itself or as part of another substituent, refers to $C_{1-x}$alkyl groups that are divalent, i.e., with two single bonds for attachment to two other groups. Alkylene groups may be linear or branched and may be substituted as indicated herein.

In a particular embodiment, $R^1$ is $C_{3-8}$cycloalkyl. As used herein, the term "$C_{3-8}$cycloalkyl", by itself or as part of another substituent, refers to a saturated cyclic alkyl group containing from about 3 to about 8 carbon atoms. Examples of $C_{3-8}$cycloalkyl include cyclopropyl, cyclobutyl, cyclopentyl, or cyclohexyl, cycloheptyl and cyclooctyl. In particular embodiments, $R^1$ may be a cycloalkyl selected from the group consisting of cyclopropyl, cyclobutyl, cyclopentyl, and cyclohexyl.

In a particular embodiment, $R^1$ is $C_{3-8}$cycloalkenyl. As used herein, the term "cycloalkenyl" by itself or as part of another substituent, refers to a non-aromatic mono- or multicyclic ring system comprising about 3 to 8 carbon atoms, preferably about 5 to 8 carbon atoms, which contains at least one carbon-carbon double bond. Preferred cycloalkenyl rings contain 5 or 6 ring atoms, such as cyclopentenyl and cyclohexenyl.

In a particular embodiment, $R^1$ is a $C_{6-10}$aryl. As used herein, the term "$C_{6-10}$aryl", by itself or as part of another substituent, refers to a polyunsaturated, aromatic hydrocarbyl group having a single ring (i.e. phenyl) or multiple aromatic rings fused together (e.g. naphthalene), or linked covalently, typically containing 6 to 10 carbon atoms; wherein at least one ring is aromatic. Aryl rings may be unsubstituted or substituted with from 1 to 4 substituents on the ring. Examples of $C_{6-10}$aryl include phenyl, naphthyl, indanyl, or 1,2,3,4-tetrahydro-naphthyl.

In a particular embodiment, $R^1$ is $C_{2-12}$alkenyl, preferably $C_{2-6}$alkenyl. The term "alkenyl" by itself or as part of another substituent, refers to an unsaturated hydrocarbyl group, which may be linear, or branched, comprising one or more carbon-carbon double bonds. When a subscript is used herein following a carbon atom, the subscript refers to the number of carbon atoms that the named group may contain. Thus, for example, "$C_{2-6}$alkenyl" means an alkenyl of two to six carbon atoms. Non-limiting examples of $C_{2-6}$alkenyl groups include ethenyl, 2-propenyl, 2-butenyl, 3-butenyl, 2-pentenyl and its chain isomers, 2-hexenyl and its chain isomers, 2,4-pentadienyl and the like.

In a particular embodiment, $R^1$ is $C_{2-12}$alkynyl, preferably $C_{2-6}$alkynyl. The term "alkynyl" by itself or as part of another substituent, refers to an unsaturated hydrocarbyl group, which may be linear, or branched, comprising one or more carbon-carbon triple bonds. When a subscript is used herein following a carbon atom, the subscript refers to the number of carbon atoms that the named group may contain. Thus, for example, "$C_{2-6}$alkynyl" means an alkynyl of two to six carbon atoms. Non limiting examples of $C_{2-6}$alkynyl groups include ethynyl, 2-propynyl, 2-butynyl, 3-butynyl, 2-pentynyl and its chain isomers, 2-hexynyl and its chain isomers and the like.

In a particular embodiment, $R^1$ is heterocyclyl, preferably a 3- to 8-membered heterocyclyl. The terms "heterocyclyl" or "heterocyclo" as a group or part of a group, refer to non-aromatic, fully saturated or partially unsaturated cyclic groups (for example, 3 to 7 member monocyclic, 7 to 11 member bicyclic, or containing a total of 3 to 10 ring atoms) which have at least one heteroatom in at least one carbon atom-containing ring. Each ring of the heterocyclic group containing a heteroatom may have 1, 2, 3 or 4 heteroatoms selected N, O and/or S, where the N and S, where the N and S heteroatoms may be oxidized and the N heteroatoms may be quaternized. The heterocyclic group may be attached at any heteroatom or carbon atom of the ring or ring system, where valence allows. The rings of multi-ring heterocycles may be fused, bridged and/or joined through one or more spiro atoms. A "substituted heterocyclyl" refers to a heterocyclyl group having one or more substituent(s) (for example 1, 2 or 3 substituent(s), or 1 to 2 substituent(s)), at any available point of attachment. Non limiting exemplary heterocyclic groups include oxiranyl, pyrrolidinyl, tetrahydrofuranyl, tetrahydrothiophenyl, dihydropyrrolyl, dihydrofuranyl, imidazolidinyl, pyrazolidinyl, imidazolinyl, pyrazolinyl, oxazolidinyl, isoxazolidinyl, oxazolinyl, isoxazolinyl, thiazolidinyl, isothiazolidinyl, thiazolinyl, piperidyl, tetrahydropyranyl, indolinyl, piperazinyl, 3-dioxolanyl, 1,4-dioxanyl, 1,3-dioxolanyl, and 1,4-oxathianyl.

In particular embodiments, $R^1$ is heteroaryl. The term "heteroaryl", as used herein, represents a stable 5- to 10-membered aromatic ring system which consists of carbon atoms and from one to four heteroatoms selected from the group consisting of N, O and S, and wherein the nitrogen and sulfur heteroatoms may optionally be oxidized, and the nitrogen heteroatom may optionally be quaternized. Preferably, said heteroaryl is a 5- to 6-membered aromatic ring. Examples of such heteroaryl groups include, but are not limited to, furan, furazan, imidazole, isothiazole, isoxazole, oxadiazole, oxazole, pyrazine, pyrazole, pyridazine, pyridine, pyrimidine, pyrrole, tetrazole, thiadiazole, thiazole, thiophene, triazine, triazole, and N-oxides thereof. Preferably said heteroaryl is furan.

The term "$C_{7-16}$aralkyl" or "$C_{7-16}$arylalkyl", as a group or part of a group, means an arylalkyl in which the aryl and alkyl are as previously described, wherein the aryl and alkyl together contain 7 to 16 carbon atoms. The bond to the parent moiety is through the alkyl. Examples of $C_{7-16}$aralkyl radicals include benzyl, phenethyl, 3-(2-naphthyl)-butyl, and the like.

The term "$C_{7-16}$alkylaryl", as a group or part of a group, means an alkyl-aryl in which the aryl and alkyl are as previously described, wherein the aryl and alkyl together contain 7 to 16 carbon atoms. The bond to the parent moiety is through the aryl. A non-limiting example of a $C_{7-16}$alkylaryl is tolyl.

In particular embodiments, $R^1$ is heterocyclyl$C_{1-6}$alkyl. The term "heterocyclyl$C_{1-6}$alkyl", as a group or part of a group, means a $C_{1-6}$alkyl as defined herein, wherein at least one hydrogen atom is replaced by at least one heterocyclyl as defined herein, more particularly a 3- to 8-membered heterocyclyl, more particularly a 3- to 6-membered heterocyclyl, and even more particularly a 3- to 5-membered heterocyclyl.

In particular embodiments, $R^1$ is heteroaryl$C_{1}$alkyl. The term "heteroaryl$C_{1-6}$alkyl", as a group or part of a group, means a $C_{1-6}$alkyl as defined herein, wherein at least one hydrogen atom is replaced by at least one heteroaryl as defined herein, more particularly a 5- to 10-membered heteroaryl, more particularly a 5- to 6-membered heteroaryl. The bond to the parent moiety is through the alkyl.

In particular embodiments, $R^1$ is $C_{4-18}$cycloalkylalkyl, more particularly $C_{4-8}$cycloalkylalkyl. The term "$C_{4-18}$cycloalkylalkyl" as a group or part of a group, means an cycloalkyl-alkyl in which the cycloalkyl and alkyl are as previously described, wherein the cycloalkyl and alkyl together contain 4 to 10 carbon atoms. The bond to the parent moiety is through the alkyl. Examples of $C_{4-10}$cycloalkylalkyl radicals include cyclopropylmethyl, cyclopropylethyl, cyclopropylpropyl, cyclopentylmethyl, cyclopentylethyl, cyclopentylpropyl, cyclohexylmethyl, cyclohexylethyl, and cyclohexylpropyl.

In a particular embodiment, $R^1$ is $C_{4-10}$cycloalkenylalkyl. As used herein, the term "$C_{4-10}$cycloalkenylalkyl" as a group or part of a group, means an cycloalkenyl-alkyl in which the cycloalkenyl and alkyl are as defined herein, wherein the cycloalkenyl and alkyl together contain 4 to 10 carbon atoms. The bond to the parent moiety is through the alkyl.

In particular embodiments, $R^{10}$ is $C_{1-8}$alkylene. In further embodiments, $R^{10}$ is $C_{1-6}$alkylene, more particularly $C_{1-4}$alkylene. Non-limiting examples of $C_{1-6}$alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—$CH(CH_3)$—$CH_2$—), 3-methylpropylene (—$CH_2$—$CH_2$—$CH(CH_3)$—), n-butylene (—$CH_2$—$CH_2$—$CH_2$—$CH_2$—), 2-methylbutylene (—$CH_2$—$CH(CH_3)$—$CH_2$—$CH_2$—), 4-methylbutylene (—$CH_2$—$CH_2$—$CH_2$—$CH(CH_3)$—), pentylene and its chain isomers, and hexylene and its chain isomers.

In particular embodiments, $R^{10}$ is an ether or oligoether of formula —$R^{11}[OR^{12}]_mR^{13}$—, wherein $R^{11}$, $R^{12}$ and $R^{13}$ are independently from each other $C_{1-4}$alkylene; and m is an integer from 1 to 4. In further embodiments, $R^{11}$, $R^{12}$ and $R^{13}$ are independently from each other $C_{1-3}$alkylene; and m is an integer from 1 to 3.

In particular embodiments, $R^{10}$ is $C_{3-8}$cycloalkylene. As used herein, the term "cycloalkylene", by itself or as part of another substituent, refers to a cycloalkyl moiety as defined herein which is divalent.

In a particular embodiment, $R^{10}$ is $C_{3-8}$cycloalkenylene. As used herein, the term "cycloalkenylene" by itself or as part of another substituent, refers to a cycloalkenyl as defined herein, which is divalent. Preferred cycloalkenylene rings contain 5 or 6 ring atoms, such as cyclopentenylene and cyclohexenylene.

In particular embodiments, $R^{10}$ is $C_{6-10}$arylene. As used herein, the term "arylene", by itself or as part of another substituent, refers to an aryl moiety as defined herein which is divalent.

In particular embodiments, $R^{10}$ is $C_{2-12}$alkenylene, preferably $C_{2-6}$alkenylene. The term "alkenylene" by itself or as part of another substituent, refers to an alkenyl moiety as defined herein, which is divalent.

In particular embodiments, $R^{10}$ is $C_{2-12}$alkynylene, preferably $C_{2-6}$alkynylene. The term "alkynylene" by itself or as part of another substituent, refers to an alkynyl moiety as defined herein, which is divalent.

In particular embodiments, $R^{10}$ is heterocyclylene, preferably a 3- to 8-membered heterocyclylene. The term "heterocyclylene" as a group or part of a group, refers to a heterocyclyl moiety as defined herein, which is divalent.

In particular embodiments, $R^{10}$ is heteroarylene. The term "heteroarylene", as used herein, refers to a heteroaryl moiety as defined herein, which is divalent.

In particular embodiments, $R^{10}$ is $C_{7-16}$aralkylene. The term "aralkylene" as a group or part of a group, refers to an aralkyl moiety as defined herein, which is divalent.

In particular embodiments, $R^{10}$ is "$C_{7-16}$alkylarylene". The term "alkylarylene", as a group or part of a group, refers to an alkylarylene as defined herein, which is divalent.

In particular embodiments, $R^{10}$ is heterocyclyl$C_{1-6}$alkylene. The term "heterocyclyl$C_{1-6}$alkylene", as a group or part of a group, refers to a heterocyclyl$C_{1-6}$alkyl moiety as defined herein, which is divalent.

In particular embodiments, $R^{10}$ is heteroaryl$C_{1-6}$alkylene. The term "heteroaryl$C_{1-6}$alkylene", as a group or part of a group, refers to a heteroaryl$C_{1-6}$alkyl as defined herein, which is divalent.

In particular embodiments, $R^{10}$ is $C_{4-10}$cycloalkylalkylene, more particularly $C_{4-8}$cycloalkylalkylene. The term "cycloalkylalkylene" as a group or part of a group, refers to a cycloalkylalkylene as defined herein, which is divalent.

In a particular embodiment, $R^{10}$ is $C_{4-10}$cycloalkenylalkylene. As used herein, the term "$C_{4-10}$cycloalkenylalkylene" as a group or part of a group, means an cycloalkenylalkylene in which the cycloalkenyl and alkylene are as defined herein, wherein the cycloalkenyl and alkylene together contain 4 to 10 carbon atoms.

The term "halo" or "halogen" as used herein refers to fluoro, chloro, bromo or iodo.

The term "amino" by itself or as part of another substituent, refers to —$H_2$.

The term "hydroxyl" by itself or as part of another substituent, refers to —OH.

The term "sulfhydryl", by itself or as part of another substituent, refers to an —SH group.

The term "cyano", by itself or as part of another substituent, refers to an —CN group.

The term "phosphonate" as used herein includes phosphonic acids, and esters or salts thereof. The term "phosphinate" as used herein includes phosphinic acids, and esters or salts thereof.

The metal or silicon oxides and hydroxides envisaged for use in the membranes described herein may be porous. The term "porous" as used herein refers to solid materials with pores, i.e. cavities, channels or interstices. The skilled person will understand that for the internal coating of small pores, the groups $R^1$, $R^{1'}$, and $R^{10}$ as described herein preferably are as small as possible. For example, $R^1$ and $R^{1'}$ may be methyl or phenyl, and $R^{10}$ methylene. Such short groups typically provide the best protection against fouling. However, larger groups may still be suitable for coating the outer surface of an oxide or hydroxide, or the inner surface of larger pores.

The present application relates to the field of membranes for filtration, in particular ceramic microfiltration, ultrafiltration or nanofiltration membranes.

The term "nanofiltration", "ultrafiltration" or "microfiltration" as used herein refers to filtration using size exclusion by means of a porous membrane, which will allow the passage of solvents while retarding the passage of larger solute molecules, when a pressure gradient is applied across the membrane. Typically, microfiltration membranes have pore sizes in the range of 0.1 micrometer, capable of retaining viruses and bacteria. Typically, ultrafiltration membranes have pore sizes in the range of 2 to 50 nm. Typically, nanofiltration membranes is characterized by molecular weight cut-off values between 200 and 1000 Da, which makes 1-step removal of bacteria, viruses, natural organic matter and micropollutants feasible, without complete removal of inorganic salts. Therefore, the pore size (equivalent diameter) of the nanofiltration membrane is typically in the order of 1 nanometer. Typical values are between 0.5 (tight NF) and 5 nm (open NF).

Provided herein are methods of protecting such membranes against fouling. The advantages of the membranes envisaged herein apply to microfiltration, ultrafiltration or nanofiltration membranes. In particular embodiments the membranes envisaged are nanofiltration membranes. Nanofiltration membranes have different applications. One important application is to partially soften potable water, allowing some minerals to pass into the product water and thus increase the stability of the water and prevent it from being aggressive to distribution piping material. Additionally, nanofiltration membranes are finding increasing use for purifying industrial effluents and minimizing waste discharge.

The methods described herein comprise the grafting of a membrane comprising a silicon or metal oxide and/or hydroxide with an organic moiety, by reacting said surface with an organometallic reagent, a phosphonate, a phosphinate, or an organosilane comprising said organic moiety (or a protected form or precursor thereof). This will be explained more in detail herein below.

Functionalized Inorganic Matrix

The methods described herein allow for the protection of a membrane comprising one or more oxides and/or hydroxides of metals or silicon against fouling. Additionally or alternatively, these methods may also be used for protecting metal or silicon oxides and/or metal hydroxides which will be incorporated in filtration membranes, against fouling.

In the present description, the one or more metal (or silicon) oxides and/or metal (or silicon) hydroxides will be referred to as "inorganic matrix". The term "inorganic matrix" may refer to the metal (or silicon) oxides and/or metal (or silicon) hydroxides as such, or in the form of a membrane. Accordingly, the term "matrix" as used herein also refers to a "membrane". In further particular embodiments the term "inorganic matrix" also refers to an "inorganic membrane", also denoted herein as a "ceramic membrane".

In certain embodiments of the methods and applications envisaged herein, the functionalized matrix is an inorganic filtration membrane or ceramic filtration membrane. As used herein, the expression "inorganic filtration membrane" or "ceramic filtration membrane" is intended to cover inorganic membranes which can be used for microfiltration, ultrafiltration or nanofiltration. In particular embodiments, the inorganic filtration membranes are membranes which are suitable for the filtration of aqueous compositions, more particularly compositions comprising at least 50 wt % (weight percent) water, preferably at least 70 wt % water, more preferably at least 90 wt % water. Such compositions may include, but are not limited to ground water, surface water, paper pulp effluents, emulsions such as oil/water wastes (as will be detailed below).

However, the membranes described herein may also show reduced fouling when used for the filtration of non-aqueous compositions. Accordingly, the functionalized membranes as described herein may also be used for the treatment or filtration of non-aqueous compositions.

Ceramic filtration membranes may have a variety of shapes. In particular embodiments, the inorganic matrix described herein may be in the form of a tube, sheet, disc or other shape that is permeable to substances in solution.

Techniques for preparing such membranes are well known in the art. A commonly used technique for preparing such filtration membranes involves depositing one or more selective or filtering layers (comprising the metal/silicon hydroxides and/or oxides) of a few hundreds of nanometers or less in thickness onto a macroporous support matrix which provides the mechanical strength. The filtering layer is usually obtained by depositing mineral oxides onto the matrix, followed by a final heat treatment.

The skilled person will understand that an inorganic matrix for use in a liquid filtration membrane typically is porous. The pore size may depend on the type of filtration which is desired, such as microfiltration, ultrafiltration or nanofiltration (as explained above). In certain embodiments the inorganic matrix is porous, wherein the average pore size (or equivalent diameter) is between 0.5 to 200 nm, more preferably between 0.5 to 100 nm, more preferably between 0.5 to 50 nm, more preferably between 0.5 to 30 nm, more preferably between 0.9 nm and 10.0 nm, as measured by Molecular weight cut-off (indirect) and permporometry or nitrogen sorption techniques applied on powders of the top layer (direct), as known by the skilled person in the art.

In particular embodiments, the methods and applications envisaged herein relate to an organically functionalized inorganic matrix, wherein said matrix is a ceramic filtration membrane comprising a support made of inorganic material coated with at least one separating membrane layer having an average pore size of is between 0.5 to 200 nm, more preferably between 0.5 to 100 nm, more preferably between 0.5 to 50 nm, more preferably between 0.5 to 30 nm, more preferably between 0.9 to 10 nm.

Inorganic membranes envisaged for use in the context of the present methods comprise an inorganic matrix characterized by a structure which can be represented by $M^1$-OH and $M^1$-O-$M^1$ structure in which $M^1$ is a metal or silicon. In the envisaged methods, the surface modification typically involves the replacement of hydroxyl (—OH) groups provided on the surface of the membrane by organic functional groups.

The one or more metal oxides and/or hydroxides of the inorganic matrix may be crystalline or non-crystalline (amorphous), or may comprise a mixture of crystalline and amorphous phases. If the inorganic matrix comprises silicon oxide and/or silicon hydroxide, the silicon oxide and/or silicon hydroxide typically is amorphous. Thus, the inorganic membranes envisaged herein typically comprise
  an oxide and/or hydroxide of a metal; and/or
  an amorphous silicon oxide.

The one or more elements $M^1$ in the hydroxides or oxides described herein are preferably selected from titanium, zirconium, aluminium, silicon, strontium, yttrium, lanthanum, hafnium, thorium, iron, and manganese and various possible mixtures thereof. The above mentioned separating membrane layers are preferably formed from transition metal oxide(s), more specifically selected from group 4 of the IUPAC periodic table, in particular Ti and/or Zr. In general, the inorganic matrix is preferably made of titanium oxide and/or of zirconium oxide.

Examples of inorganic matrices that are envisaged for use in the methods and applications described herein include for instance, but are not limited to:
  a zirconium oxide matrix having a pore size of 3 nm or a titanium oxide matrix having a pore size of 0.9, 1 or 5 nm (purchasable from Inopor);
  a titanium oxide matrix with cut-off of 5 or 10 kDalton (pore size on average 3 to 6 nm) (purchasable from Atech);
  a mixed oxide matrix (titaniumoxide+zirconiumoxide) with cut-off of 5 or 10 kDalton (pore size on average 3 to 6 nm) (purchasable from Atech); and
  a titaniumoxide matrix with cut-off of 1, 3, 5 or 8 kDalton (pore size on average 1 to 5 nm) (purchasable from Tami Industries).

The methods described herein aim to reduce the sensitivity of an inorganic matrix to fouling, by means of chemical surface modification, also denoted as "functionalization". Thus, the methods described herein generate a functionalized matrix, more particularly an organically functionalized matrix. The terms "organically functionalized matrix" or simply "functionalized matrix" as used herein refers to an inorganic matrix of which the surface properties have been changed or modified (functionalized) by covalently binding an organic group $R^1$ or $R^{10}$ thereto.

In the context of the present application, the functionalization results in a functionalized matrix which is more hydrophobic (i.e. less hydrophilic) compared to the matrix before functionalization (non-functionalized or native matrix). The increased hydrophobicity can be assessed in various ways, e.g. via contact angle measurement or flux measurements. More particularly, the functionalization as described herein does not lead to an increased water flux, and will typically result in a reduced water flux. In particular embodiments, the water flux of the functionalized matrix is at least 10% below the water flux of the non-functionalized matrix. Preferably, the water flux is measured using deionized water in a cross flow system, with a flow velocity of 2 m/s, a trans membrane pressure (TMP) of 5 bar. In further embodiments, the water flux of the functionalized matrix is at least 20% below or even at least 30% below the water flux of the non-functionalized matrix.

More particularly, the methods described herein involve functionalizing an inorganic matrix comprising an oxide and/or hydroxide of an element $M^1$ which is a metal or silicon, by functionalization of the surface of the inorganic matrix with an organic moiety $R^1$ or $R^{10}$ in order to decrease the sensitivity of the inorganic matrix to fouling. In certain embodiments, the inorganic matrix may be functionalized with two organic moieties (e.g. $R^1$ and $R^{1'}$), for example via reaction of the inorganic matrix with a reagent of formula $R^1$-$M^2$-$R^{1'}$ (see further), via reaction of the inorganic matrix with a mixture of reagents, and/or via iteration of the method on the same inorganic matrix using different reagents. $R^1$ and $R^{1'}$ may be the same or different.

It has been found that the functionalization of the membranes with specific organic moiety $R^1$ or $R^{10}$ as described herein decreases the sensitivity of the inorganic matrix to fouling. In general, short $R^1$ or $R^{10}$ moieties are preferred. Particularly preferred $R^1$ or $R^{10}$ moieties are provided herein below.

In particular embodiments, $R^1$ is selected from the list consisting of $C_{1-8}$alkyl, $C_6$aryl, $C_{7-10}$alkylaryl, $C_{7-10}$arylalkyl, —$R^7[OR^8]_nR^9$, $C_{3-6}$cycloalkyl, $C_{5-6}$cycloalkenyl, $C_{4-10}$cycloalkylalkyl, $C_{6-10}$cycloalkenylalkyl, $C_{2-8}$alkenyl, 3- to 6-membered heterocyclyl, 5- to 8-membered heteroaryl, heterocyclyl$C_{1-4}$alkyl, heteroaryl$C_{1-4}$alkyl and $C_{2-8}$alkynyl; wherein $R^7$ and $R^8$ are independently from each other $C_{1-3}$alkylene; n is an integer from 1 to 3; and $R^9$ is $C_{1-3}$ alkyl; and
$R^{10}$ is selected from the list consisting of $C_{1-8}$alkylene, $C_6$arylene, $C_{7-10}$alkylarylene, $C_{7-10}$arylalkylene, —$R^{11}[OR^{12}]_mR^{13}$, $C_{3-6}$cycloalkylene, $C_{5-6}$cycloalkenylene, $C_{4-10}$cycloalkylalkylene, $C_{6-10}$cycloalkenylalkylene, $C_{2-8}$alkenylene, 3- to 6-membered heterocyclylene, 5- to 8-membered heteroarylene, heterocyclyl$C_{1-4}$alkylene, heteroaryl$C_{1-4}$alkylene and $C_{2-8}$alkynylene; wherein $R^{11}$, $R^{12}$ and $R^{13}$ are independently from each other $C_{1-3}$alkylene; and m is an integer from 1 to 3. In certain embodiments, $R^1$ is selected from the list consisting of $C_{1-6}$alkyl, phenyl, $C_{7-8}$alkylaryl, $C_{7-8}$arylalkyl, —$R^7[OR^8]_nR^9$, $C_{3-6}$cycloalkyl, $C_{5-6}$cycloalkyl, $C_{4-7}$cycloalkylalkyl, $C_{6-8}$cycloalkenylalkyl, $C_{2-6}$alkenyl, 3- to 6-membered heterocyclyl, 5- to 6-membered heteroaryl, heterocyclyl$C_{1-3}$alkyl, heteroaryl$C_{1-3}$alkyl and $C_{2-6}$alkynyl; wherein $R^7$ and $R^8$ are independently from each other $C_{1-2}$alkylene; n is an integer from 1 to 3; and $R^9$ is $C_{1-2}$ alkyl; and
$R^{10}$ is selected from the list consisting of $C_{1-6}$alkylene, phenylene, $C_{7-8}$alkylarylene, $C_{7-8}$arylalkylene, —$R^{11}[OR^{12}]_mR^{13}$, $C_{3-6}$cycloalkylene, $C_{5-6}$cycloalkenylene, $C_{4-7}$cycloalkylalkylene, $C_{6-8}$cycloalkenylalkylene, $C_{2-6}$alkenylene, 3- to 6-membered heterocyclylene, 5- to 6-membered heteroarylene, heterocyclyl$C_{1-3}$alkylene, heteroaryl$C_{1-3}$alkylene and $C_{2-6}$alkynylene; wherein $R^{11}$, $R^{12}$ and $R^{13}$ are independently from each other $C_{1-2}$alkylene; and m is an integer from 1 to 3. In certain embodiments, $R^1$ is selected from the list consisting of $C_{1-6}$alkyl, phenyl, benzyl, tolyl, —$R^7[OR^8]_nR^9$, $C_{2-6}$alkenyl, furyl, 1-furylmethyl, and 1,3-dioxolan-2-ylmethyl; and $R^{10}$ is $C_{1-6}$alkylene; wherein $R^7$ and $R^8$ are independently from each other $C_{1-2}$alkylene; n is an integer from 1 to 3; and $R^9$ is $C_{1-2}$ alkyl.

In certain embodiments, $R^1$ is selected from the group consisting of $C_{1-6}$alkyl, phenyl, and benzyl. Such groups were found to provide excellent antifouling properties. In specific embodiments, $R^1$ is selected from the group consisting of $C_{1-6}$alkyl and phenyl, more particularly methyl or phenyl. In certain embodiments, $R^1$ is $C_{1-6}$alkyl, preferably selected from methyl, ethyl, and propyl.

Optionally, the membranes may further be grafted with one or more moieties $R^{1'}$ which can be the same or different from $R^1$. In certain embodiments, $R^1$ and $R^{1'}$ are identical. If $R^1$ and $R^{1'}$ are not identical, $R^{1'}$ typically is less bulky than $R^1$. More particularly, $R^{1'}$ preferably comprises less carbon atoms than $R^1$.

In particular embodiments, said $R^1$, $R^{1'}$, and/or $R^{10}$ as described above may be further substituted with one or more groups selected from hydroxyl, —$OR^4$, amino, halo, sulfhydryl, —$SR^5$, —COOH, and —$COOR^6$; wherein $R^4$, $R^5$, and $R^6$ are independently selected from $C_{1-6}$alkyl, halo and $C_{6-10}$aryl. In certain embodiments, the one or more substituents are independently selected from hydroxyl, amino, halo, sulfhydryl, and —COOH.

The skilled person will understand that only a limited number of hydrophilic substituents such as hydroxyl should be used in order to ensure a functionalization which renders the inorganic matrix more hydrophobic compared to the native inorganic matrix. More particularly, the number and/or position of the optional substituents can be selected so as to ensure a decreased hydrophilicity (i.e. an increased hydrophobicity) of the grafted membrane compared to the native membrane (i.e. the membrane before grafting).

It is however envisaged that in other embodiments, said $R^1$, $R^{1'}$ and/or $R^{10}$ as described above may not be provided with further substituents.

The functionalization or grafting of the surface of the inorganic matrix with an organic moiety $R^1$ or $R^{10}$ may be obtained by reacting the inorganic matrix with one or more organometallic reagents, phosphonates, phosphinates, and/or organosilanes. This will be explained in more detail herein below.

Reaction with Organometallic Reagent

In particular embodiments, the method for protecting an oxide or hydroxide against fouling as described herein may involve grafting the surface of the inorganic matrix with an organic moiety $R^1$ via reaction with an organometallic reagent, such as a Grignard reagent and/or an organolithium reagent.

A procedure for the functionalization of an inorganic matrix via reaction with organometallic chemistry suitable for use in the present method, is based on the method for obtaining a functionalized matrix as described in international patent application WO 2010/106167, which is hereby incorporated by reference. Thus, in certain embodiments, the reaction of the inorganic matrix with the organometallic reagent comprises an appropriate pretreatment of the inorganic matrix, including drying the matrix; reacting the dried matrix in the presence of a dry solvent with said organometallic reagent, thereby obtaining a functionalized matrix; and optionally, washing and drying the functionalized matrix.

The functionalization via reaction with an organometallic compound as described in WO 2010/106167 results in the functionalization of the matrix with one or more $R^1$ (and optionally $R^{1'}$) moieties, as defined herein, that are directly bound covalently to an element $M^1$ (being a metal or silicon) on a surface of said matrix via a direct $M^1$-$R^1$ bond. More particularly, the direct $M^1$-$R^1$ bond can be obtained via a direct $M^1$-C bond i.e. not including an oxygen bridge.

If $M^1$ is a metal, this can improve the stability of the obtained matrix, compared to grafting with an organosilane, which typically forms a $M^1$-O—Si—R covalent bond which is more sensitive to hydrolysis.

Organometallic reagents as used herein may be represented by formula $R^1$-$M^2$, or formula $R^1$-$M^2$-X, or formula $R^1$-$M^2$-$R^{1'}$, wherein $R^1$ and $R^{1'}$ can be different or identical and are moieties as defined above, $M^2$ is a metal selected from group 1 or 2 of the IUPAC periodic table, more particularly selected from Li and/or Mg, and wherein X is halo. It is noted that where $R^1$ and/or $R^{1'}$ as defined above comprises a functional group which is not compatible with organometallic compounds, such group should be provided in a protected form (i.e. with a protective group). Protective groups are well known in the art and will not be disclosed in detail herein.

In particular embodiments, the organometallic reagent is an organolithium reagent or an organomagnesium reagent. An organolithium reagent is an organometallic compound with a direct bond between a carbon and a lithium atom and may be represented by the general formula $R^1$—Li wherein $R^1$ is a moiety as defined herein above. Preferred organolithium compounds are $C_{1-4}$alkyllithium such as methyllithium, and phenyllithium. Reaction of an inorganic matrix with such organolithium reagents can result in a functionalized matrix which is particularly resistant to fouling.

An organomagnesium reagent is an organometallic compound with a direct bond between a carbon and a magnesium atom and may be represented by the general formula $R^1$—Mg—X (Grignard reagent) or $R^1$—Mg—$R^{1'}$, wherein $R^1$ and $R^{1'}$ are moieties as defined herein and wherein $R^1$ and $R^{1'}$ can be different or identical, and wherein X is halo, and preferably bromo, chloro, or iodo. A preferred organometallic reagent for use in the present method is a Grignard reagent. Particularly preferred Grignard reagents are $C_{1-4}$alkyllmagnesium halide such as methylmagnesium halide, and phenylmagnesium halide. Reaction of an inorganic matrix with such Grignard reagents can result in a functionalized matrix which is particularly resistant to fouling.

In particular embodiments, of the matrix may be reacted with two or more different organometallic reagents, thereby allowing to directly bind on a surface of an inorganic membrane two or more different types of moieties.

Reaction with Phosphonate or Phosphinate

In particular embodiments, the method for protecting an oxide or hydroxide against fouling as described herein may involve grafting the surface of the inorganic matrix with an organic moiety $R^1$ or $R^{10}$ via reaction with a phosphonate and/or a phosphinate. In contrast with the reaction with organometallic reagents as described above, some phosphonate reactions may be performed using aqueous solutions or organic solutions which do not need to be dried. Nevertheless, phosphonate or phosphinate reactions may also be performed in dried organic solvents.

Various procedures for the functionalization of an inorganic matrix via a (condensation) reaction with phosphonates which are suitable for use in the present method are known in the art. An example of a suitable procedure is the one described in patent application US 2002/0023573, which is hereby incorporated by reference.

The functionalization via reaction with an phosphonate or phosphinate as described therein results in the functionalization of the matrix with a $R^1$ moiety, as defined herein, that are bound covalently to a metal (or silicon) $M^1$ on a surface of said matrix via a covalent $M^1$-O—P—$R^1$ bond, more particularly via a covalent $M^1$-O—P—C bond. With phosphonates, the same phosphorous atom may be bound to the matrix via a mono-, bi-, or tridentate bond (i.e. via one, two, or three P—O-$M^1$ bonds). The $M^1$-O—P—$R^1$ bond typically provides sufficient stability for use of the functionalized material in filtration, for cleaning of the material, etc.

In particular embodiments, the inorganic matrix may be reacted with a diphosphonate or diphosphinate. This can result in the functionalization of the matrix with a $R^{10}$ moiety, as defined herein, that is bound to a metal (or silicon) $M^1$ on a surface of said matrix via two covalent bonds, forming a bridged structure, represented by $M^1$-O—P—$R^{10}$—P—O-$M^1$. Accordingly, $R^{10}$ can be bound to two elements $M^1$ (which can be the same or different) of the inorganic matrix, thus forming a bridge. This can increase the stability of the functionalized matrix. Again, with phosphonates, the same phosphorous atom may be bound to the matrix via a mono-, bi-, or tridentate bond.

It is noted that where $R^1$ or $R^{10}$ as defined above comprises a functional group which is not compatible with the functionalization process (via reaction with organometallic reagents or phosphonates), such group should be provided in a protected form (i.e. with a protecting group), that is to be removed after functionalization. Protecting groups, and the methods for removing them are well known in the art and will not be disclosed in detail herein.

In particular embodiments, the grafting described herein may involve grafting the surface of the inorganic matrix with an organic moiety $R^1$ via reaction with a phosphonate reagent. More particularly, said phosphonate reagent is a compound having a formula corresponding to the structures herein below. In particular embodiments, said phosphonate is a compound of formula (I)

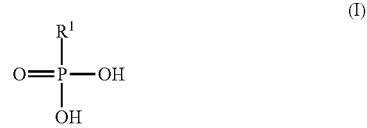

or a salt or ester thereof, wherein $R^1$ has the same meaning as described above.

Preferred salts or esters of the compound of formula (I) are phosphonates of formula (II)

wherein $R^1$ has the same meaning as described above; and wherein $R^2$ and $R^3$ are independently selected from hydrogen, $C_{1-18}$alkyl, $C_{6-14}$aryl, and $C_{3-16}$cycloalkyl. In certain embodiments, $R^2$ and $R^3$ are independently selected from hydrogen, halo, and $C_{1-12}$alkyl. In esters or salts of the compound of formula (II), at least one of $R^2$ and $R^3$ is not hydrogen.

Preferred phosphinates are phosphinates of formula (III)

or a salt or ester thereof, wherein $R^1$ and $R^{1'}$ are as defined above.

Preferred diphosphonates are compounds of formula (IV)

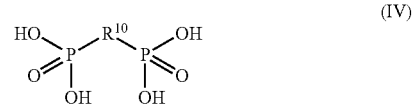

or a salt or ester thereof, wherein $R^{10}$ has the same meaning as described above.

In particular embodiments, the grafting described herein may involve grafting the surface of the inorganic matrix with an organic moiety $R^1$ or $R^{10}$ via reaction with a phosphonate reagent, wherein said phosphonate is a compound selected from the group consisting of methylphosphonic acid, phenylphosphonic acid, 2-(2-ethoxyethoxy)ethylphosphonic acid, 6-phosphonohexanoic acid, 1-[2-(2-diethoxyphosphorylethoxy)ethoxy]-2-methoxy-ethane, 5-diethoxyphosphorylhexan-1-ol, 10-diethoxyphosphoryldecanoic acid, methyl 10-diethoxyphosphoryldecanoate, and 3-phosphonopropylphosphonic acid. In certain embodiments, the phosphonate reagent is methylphosphonic acid and/or phenylphosphonic acid.

In particular embodiments, the present method for protecting an oxide or hydroxide against fouling as may involve contacting the inorganic matrix with a solution comprising the phosphonic acid, and letting the phosphonic acid react with the surface of the inorganic matrix.

The reaction may be carried out at room temperature, or at elevated temperatures, e.g. under reflux conditions. In preferred embodiments, the reaction is carried out at a temperature between 20° C. and 150° C., and preferably between 20° C. and 100° C.

In order to obtain a sufficient functionalization of the inorganic matrix, the reaction is preferably carried out during a period of at least 30 minutes, preferably between one hour and 24 hours, under conditions of stirring and/or shaking of the reaction mixture, or while filtrating the reaction mixture through the membrane.

Optionally, the inorganic matrix may be washed after reaction, using an appropriate solvent, i.e. appropriate to dissolve the reaction products. Typically, this can be done using water, or the solvent applied in the synthesis. The washing process can be repeated if necessary. Preferably washing is done by means of filtration through the membrane pores, in particular to prevent that reaction products would remain on the matrix and in the pores of the matrix. Preferably filtration is done under pressure.

The grafting procedure may further optionally comprise the step of drying the obtained matrix, preferably under vacuum. The drying of the matrix may be done in a similar way as described above for the reaction with organometallic reagents.

Reaction with Organosilane Reagent

In particular embodiments, the method for protecting an oxide or hydroxide against fouling as described herein may involve grafting the surface of the inorganic matrix with an organic moiety $R^1$ or $R^{10}$ via reaction with an organosilane reagent.

Reaction of the inorganic matrix with an organosilane results in the functionalization of the matrix with a $R^1$ moiety which is bound covalently to a metal (or silicon) $M^1$ on a surface of said matrix via a covalent $M^1$-O—Si—$R^1$ bond, more particularly via a covalent $M^1$-O—Si—C bond.

As described above, the $M^1$-O—Si—$R^1$ bond typically is less stable than a direct $M^1$-$R^1$ bond if $M^1$ is metal. However, if $M^1$ is silicon, the $M^1$-O—Si—$R^1$ bond provides an excellent stability. In certain embodiments, $R^1$ is bound covalently to $M^1$ via a covalent $M^1$-O—Si—$R^1$ bond, provided that $M^1$ is silicon.

In particular embodiments, the inorganic matrix may be reacted with a disilane. This can result in the functionalization of the matrix with a $R^{10}$ moiety, as defined above, that is bound to $M^1$ via two covalent bonds, forming a bridged structure, represented by $M^1$-O—Si—$R^{10}$—Si—O-$M^1$. Accordingly, $R^{10}$ can be bound to two elements $M^1$ (which can be the same or different) of the inorganic matrix, thus forming a bridge. This can increase the stability of the functionalized matrix.

Various procedures for the functionalization of an inorganic matrix via a (condensation) reaction with organosilanes which are suitable for use in the present method are known in the art. An example of a suitable procedure is the one described in patent application US 2006/237361, which is hereby incorporated by reference.

In particular embodiments, the organosilane grafting described herein may involve grafting the surface of the inorganic matrix with an organic moiety $R^1$ via reaction with an organosilane reagent of formula $R^1$XYZSi, wherein $R^1$, X, Y, and Z are directly bound to Si; and $R^1$ has the same meaning as defined above. At least one of X, Y, and Z is a hydrolysable group, wherein the others are independently have the same meaning as $R^{1'}$ as defined above. In particular embodiments, the organosilane is a compound of formula $(R^1)_3$XSi, wherein X is a hydrolysable group. Suitable hydrolysable groups include, but are not limited to halo, and $C_{1-8}$alkoxy such as methoxy ($CH_3O$—) or ethoxy ($CH_3CH_2O$—).

In particular embodiments, the organosilane grafting described herein may involve grafting the surface of the inorganic matrix with an organic moiety $R^{10}$ via reaction with a disilane reagent of formula (XYZ)Si$R^{10}$Si(XYZ), wherein $R^{10}$ has the same meaning as defined above. Again, at least one of X, Y and Z is a hydrolysable group, wherein the others independently have the same meaning as $R^{1'}$ as defined above. In particular embodiments, the disilane is a compound of formula $(X')_3$Si—$R^{10}$—Si$(X')_3$.

In particular embodiments, the organosilane grafting may involve an appropriate pre-treatment of the inorganic surface, contacting the inorganic matrix with a solution comprising the organosilane reagent, and letting the organosilane reagent react with the surface of the inorganic matrix, as known in the art.

Repetition of the Functionalization

In particular embodiments of the method described herein, the functionalization via reaction with an organometallic reagent or a phosphonic acid reagent may be repeated one or more times on the same inorganic matrix. Repeated modifications can for instance be applied to increase the amount of organic functional group(s) on the surface of the membrane. However, as the functionalization described herein typically results in a reduced flow it is preferred to provide the grafting as a submonolayer, which means that the surface of the inorganic matrix is not fully saturated with functional groups. In this way, the membranes can be protected against fouling while minimizing flux reduction.

Repeated functionalization may also permit to bind two or more different types of organic groups directly on a surface of a filtration membrane. Alternatively or in combination therewith, different types of organic groups can also be covalently bound by simultaneously reacting the inorganic matrix with two or more different organometallic reagents, or two or more different phosphonic acids as described above.

In particular embodiments, a functionalization using an organometallic reagent may be followed by a further functionalization using a phosphonic acid reagent, or vice versa.

Membrane

The methods envisaged herein result in functionalized inorganic matrices which can be used as filtration membranes and provide an increased resistance to fouling compared to non-functionalized inorganic matrices. Moreover, the functionalization via a direct $M^1$-C bond, an $M^1$-O—P—C bond, or an $M^1$-O—Si—C bond (particularly when $M^1$ is Si) provides a satisfactory chemical, mechanical, thermal and hydrothermal stability.

Accordingly, further provided herein are functionalized inorganic matrices, obtainable by or obtained by the methods described herein. More particularly, such membrane may comprise an oxide and/or hydroxide of an element $M^1$ which is a metal or silicon, wherein the surface of said inorganic matrix is grafted, preferably covalently grafted, with an organic functional group $R^1$, via
 a direct $M^1$-$R^1$ bond;
 at least one $M^1$-O—P—$R^1$ bond;
 a $M^1$-O—Si—$R^1$ bond;
 a $M^1$-O—P—$R^{10}$—P—O-$M^1$ bond; or
 a $M^1$-O—Si—$R^{10}$—Si—O-$M^1$ bond;
wherein $R^1$ and $R^{10}$ are as defined above.

In particular embodiments, $M^1$ is selected from the group consisting of titanium, zirconium, aluminium, silicon, strontium, yttrium, lanthanum, hafnium, thorium, iron, manganese, or combinations thereof. In certain embodiments, $M^1$ is Ti and/or Zr. In specific embodiments, the oxide and/or hydroxide of $M^1$ is titanium oxide or zirconium oxide.

In particular embodiments, the filtration membrane may comprise a support made of inorganic material coated with at least one separating membrane layer made of the oxide and/or hydroxide of metal $M^1$ at the surface. In certain embodiments, the oxide and/or hydroxide of $M^1$ may be provided as particles in a mixed matrix membrane. For example, the particles may be embedded in a polymer matrix. The preparation of mixed matrix membranes is well-known in the art. For example, the particles may be assembled on the surface of a (porous) membrane, or the particles may be blended with a (polymeric) casting solution. An overview of manufacturing procedures is provided by Kim and Van der Bruggen (*Environmental Pollution* 2010, 158, 2335-2349). The particle size and amount of particles and (polymer) matrix material can be chosen depending on the required characteristics of the membranes. In certain embodiments, the membranes are porous, having an average pore size of 0.5 nm to 200 nm, more particularly 0.5 nm to 30 nm, for example 0.9 nm to 10 nm.

As is known by a person skilled in the art, it is not easy to directly analyze the changes on the surface of a modified membrane toplayer, whether the modification is done by the procedures as described herein or via other modification techniques known in the state of the art such as silanation. This is due to the fact that the modification takes place in the pores of the thin toplayer, while the bulk of the membrane (support and intermediate layers) are not or hardly modified, such that the presence of the much thicker membrane support masks the properties of the membrane toplayer; and/or because of the curvature of the membrane, which may e.g. have a tubular shape. Therefore, an unsupported membrane toplayer material may be used in order to characterize the properties of the supported membrane toplayer, which is made in exactly the same way as the supported membrane toplayer. Suitable characterization methods for such samples include Thermal Gravimetric Analysis (TGA), IR spectroscopy solid state NMR, XPS and leaching tests or other methods known in the art, as described in international patent application WO 2010/106167, which is hereby incorporated by reference.

Flux measurements do not directly analyse the modification of the membrane surface, but are a suitable way to determine the effect of the membrane modification on the membrane performance. In case of hydrophobic modification with e.g. alkyl chains, the flux of apolar solvents will increase, while the flux of polar solvents such as water will be similar or decrease. Another indirect characterization technique determining the effect of the membrane modification on the membrane performance is a molecular weight cut-off (MWCO) measurement, permporometry and/or a (water) contact angle measurement. This is illustrated in the Examples (see further).

Use in Water Filtration

It has surprisingly been found that the organically functionalized matrices as envisaged herein are particularly suitable for use in water treatment, more particularly water purification. Indeed, it has been found that despite the functionalization with organic moieties, which in fact increases their hydrophobicity, the membranes remain suitable for filtration of aqueous compositions. As used herein, the term "water purification" refers to purification of (or removal of contaminants from) aqueous compositions comprising more than 50 wt % water, more particularly at least 70 wt % water.

More particularly it has been found that the membranes are resistant to fouling agents of aqueous compositions such as ground water or surface water. Most particularly the organically functionalized matrices are of interest in the treatment of ground water or surface water, as they have a reduced sensitivity for fouling by foulants such as humic acids in combination with inorganic salts (e.g. $Ca^{+2}$), proteins, peptides, amino acids, polysaccharides and transparent exopolymer particles (TEP). But the organically functionalized matrices are also of interest in the treatment of different waste-waters as for example (but not limited to) paper and pulp effluents, and emulsions such as oil/water waste waters.

Inorganic matrices envisaged for use in water filtration are typically made of one or more metal oxides and/or metal hydroxides due to their inherent hydrophilic nature. Typically, their surface chemistry essentially consists of a $M^1$-OH and $M^1$-O-$M^1$ structure in which $M^1$ is a metal or silicon. The methods and applications described herein envisage the use of such inorganic matrices which have been organically functionalized.

Accordingly, envisaged herein is the use of organically functionalized inorganic matrices comprising an oxide and/or hydroxide of a metal $M^1$ for water treatment, whereby the matrices are characterized in that their surface is grafted, preferably covalently grafted, with an organic functional group. More particularly, the organic group is a group such as but not limited to a group $R^1$ or $R^{10}$ as defined above.

It is envisaged that the functionalization of the element $M^1$ in the matrix is not critical and can be ensured either through a direct bond with the metal or through an oxygen bridge. In particular embodiments, the bond is a direct $M^1$-C bond, an $M^1$-O—P—C bond, or an $M^1$-O—Si—C bond. In particular embodiments $M^1$ is selected from the group consisting of titanium, zirconium, aluminum, silicon, strontium, yttrium, lanthanum, hafnium, thorium, iron, manganese, or combinations thereof. More particularly, the metal is titanium and/or zirconium.

The organically functionalized matrices for use as water treatment membranes can be obtained as described herein above.

Thus provided herein are methods of treating aqueous solutions, such as methods for the removing impurities from aqueous solutions, comprising filtering said aqueous solutions with the matrices or membranes described herein above obtainable by or obtained by the methods described herein above. In particular embodiments, the membranes are used for the (nano)filtration of aqueous compositions comprising at least 50 wt % water, preferably at least 75 wt % water, and more preferably at least 90 wt % water. In further particular embodiments, the water is groundwater, or surface water of industrial waste waters.

Practical examples where the anti-fouling effect is of critical importance include, but are not limited to, the production of drinking water from ground water or other sources of water, the purification of different waste waters including pulp and paper effluents, oil/water effluents (from olive oil production, or oil/water emulsions found in water that is used to pump up oil etc.)

Further provided herein is a method of purifying an aqueous composition, said method comprising providing a filtration membrane comprising a functionalized inorganic matrix comprising an oxide and/or hydroxide of an element $M^1$ wherein $M^1$ is a metal or silicon, characterized in that the surface of the inorganic matrix is grafted with an organic functional group $R^1$ or $R^{10}$ as described herein; and filtering said aqueous composition through said membrane so as to obtain a purified aqueous composition.

Thus methods are provided herein for purifying an aqueous composition, the method comprising filtering said aqueous composition through a filtration membrane comprising a functionalized inorganic matrix comprising an oxide and/or hydroxide of an element $M^1$ wherein $M^1$ is a metal or silicon, characterized in that the surface of the inorganic matrix is grafted with an organic functional group $R^1$ or $R^{10}$ as described herein and obtaining in the filtrate a purified aqueous composition. In particular embodiments, the purification encompasses the removal of contaminants such as oil, humics and/or other natural organic matter, and/or polyelectrolytes. In particular embodiments, the methods ensure the removal of oils or petroleum products. In particular embodiments, at least 90% of the contaminants is removed from the aqueous composition via filtering through the membrane, preferably at least 95%.

EXAMPLES

The following examples are provided for the purpose of illustrating the claimed methods and applications and by no means are meant and in no way should be interpreted to limit the scope of the present invention.

1. Fouling Prevention in Surface and Ground Water Treatment

Commercially available titanium oxide ($TiO_2$) NF membranes were grafted with various organic moieties applying both Phosphonic acids and Grignard grafting techniques. Hydrophilicity, pore size, and other structural changes after graftings were investigated by measuring water contact angles, molecular weight cut-off values, and water permeabilities. Subsequently, the grafted membranes with the highest water flux were subjected to fouling measurements with model foulants mimicking the fouling in surface and ground water treatment for drinking water production, and with model fouling solutions mimicking the fouling in the effluents of pulp and paper industry. Similar tests were performed on a native (i.e. unmodified or non-functionalized) membrane as a control. This is explained further herein below.

1.A) Materials and Methods
Membranes and Chemicals

Asymmetric $TiO_2$ NF tubular membranes having an outer diameter of 1 cm, an inner diameter of 0.7 cm, and 12 cm in length (active membrane surface area ~20 cm$^2$) with an average pore diameter of 0.9 nm were obtained from Inopor Gmbh, Germany.

All reagents and other chemicals were obtained from Sigma Aldrich: grafting reagents (methyl, phenyl, and hexadecyl phosphonic acids; methyl and phenyl magnesium bromide), model foulants (humic acid, meat peptone, laminarin), toluene, $CaCl_2$, NaOH, and HCl (of pH adjustment). The alkaline cleaning agent P3 Ultrasil 110 was obtained from Ecolab. Reverse osmosis (RO) water with a conductivity of less than 15 μs/cm and pH 6.5 was used for all filtration experiments and for phosphonic acids grafting.

Grignard Grafting $TiO_2$ membranes were grafted with methyl or phenyl groups using the organometallic Grignard reagents methyl magnesium bromide and phenyl magnesium bromide, respectively. In a first step, the membranes were properly pretreated to remove the adsorbed water of the membrane surface. Subsequently, the pretreated membranes were contacted (with stirring and shaking or with filtration) for 48 hours to a reaction mixture of Grignard reagent in diethyl ether, under sufficiently dry atmosphere. The total metal oxide pore surface reacts with the Grignard reagent and the intended groups are grafted on the membrane. MgBr salts are formed as side products of the reaction. These have been washed by a proper washing procedure. After washing, the membranes have been dried at 60° C. under vacuum before use in performance tests.

Phosphonic Acid Grafting $TiO_2$ membranes were grafted with methyl, phenyl, and hexadecyl groups using methylphosphonic acid, phenylphosphonic acid, and hexadecylphosphonic acid, respectively.

In a first step, the membranes were immersed in a solution of methyl-, phenyl-, or hexadecylphosphonic acid (0.01 to 0.1 M) in water or toluene, and treated for 4 hours at room temperature or for 4 hours under reflux at 90° C., under stirring and shaking. The modified membranes were separated by pouring out the reaction solution after 4 hours. Subsequently, the membranes were properly washed at room temperature with the reaction solvent (85-90 ml for 30 min with 5 times repetition), again under stirring and shaking. Thereafter, the membranes were fixed in a dead-end set-up at a pressure of 2 bar for washing with water inside of the pores. Subsequently, the membranes were dried at room temperature before use in performance tests.

Water Contact Angle, Permeability, and MWCO Measurement

Grafted and ungrafted membranes were characterized by measuring the Molecular Weight Cut-Off (MWCO), the water contact angle, and the water permeability of the membranes.

For the MWCO measurement, the membranes were analyzed via Gel permeation chromatography using a Shimadzu system equipped with a pump (LC-20AT), Auto sampler (sil 20AC HT), column oven (CTO-20AC) and a refractive index detector (RID 10A)). The MWCO (i.e. the molecular weight of the solute of which 90% is retained by the membrane) was determined using the method as described by I. Genné & G. Jonsson, C. Guizard, Harmonization of flux and MWCO characterization methodologies, poster presentation in international Congress on membrane and Membrane Processes (ICOM), 7-12 Jul. 2002, Toulouse, France. The water contact angle (CA) was calculated using a contact angle system OCA 15 plus manufactured by Dataphysics with the software package SCA 20.

Pure water flux was measured in a cross flow system, with a flow velocity of 2 m/s, a trans membrane pressure (TMP) of 5 bar.

Fouling Measurements

The following procedure was adopted to evaluate the fouling tendency of all membranes:

1. A reverse osmosis (RO) water flux measurement is performed at room temperature in cross-flow (2 m/s, 5 bar TMP), for 1 to 3 hours in order to obtain a stable flux.
2. Subsequently, fouling is induced by continuous filtration in dead-end mode (to enhance the fouling effect) at room temperature using a fouling solution, for 8 to 12 hours.
3. After fouling, a RO water flux measurement was performed at room temperature in cross-flow (again at 2 m/s and 5 bar TMP) to remove the reversible part of the fouling. The measurements were performed for 1 to 3 hours in order to obtain a stable flux.

The loss in water flux determined in this way, is a measure for the irreversible fouling. FIG. 2 graphically shows the RO water flux through a membrane before fouling, the foulant solution flux and the RO water flux after fouling. The difference between the RO water flux after fouling and the foulant solution flux is referred to as the amount of reversible fouling while the difference between the RO water flux before and after fouling is referred to as the amount of irreversible fouling. Flux values were calculated based on the weight of the permeate, which was recorded automatically as function of time.

Chemical Cleaning

The organically fouled membranes were cleaned using the alkaline cleaning agent P3 ultrasil 110. The following solutions and filtration conditions were used: 0.2 à 1% wt-solution of $P_3$ ultrasil 110 (i.e. pH 9 to 12, conductivity 400 to 4220 µs/cm), temperature 46 to 60° C., cross flow with a flow velocity of about 4 m/s, TMP of 0.5 to 1 bar and a filtration time of 15 to 60 minutes. After cleaning, rinsing with RO water was performed (using cross-flow filtration), and subsequently the water permeability was determined.

1.B) Results

Membrane Functionalization $TiO_2$ membranes were grafted with either methyl (M), phenyl (P), or hexadecyl (HD), via reaction with a phosphonic acid (PA) or a Grignard reagent (GR). The smaller methyl and phenyl groups were used to modify the outer membrane surface as well as the inner pore surface of the membranes, whereas the hexadecyl functional groups were grafted to only modify the outer surface of the membranes. The resulting membranes are denoted by a three or four letter code, wherein the last two letters indicate the grafting method (PA or GR), and the first one or two letters indicate the grafted group (M, P, or HD).

Membrane Characterization

In order to evaluate the impact of grafting of a specific functional group applying a specific grafting method on the pore structure and the hydrophilicity of the membranes, the molecular weight cut-off (MWCO), water contact angle, and pure reverse osmosis (RO) water permeability of the native and all grafted membranes was measured. The experimental results are summarized in Table 1.

TABLE 1

MWCO, CA, and RO water permeability values of different modified membranes in comparison to an unmodified native $TiO_2$ 0.9 nm NF membrane. MGR refers to methyl Grignard membranes, PGR to phenyl Grignard membranes, MPA to methylphosphonic acid grafted membranes, PPA to phenylphosphonic acid grafted membranes and HDPA for hexadecylphosphonic acid grafted membranes.

| Membranes ID | CA (°) | Water permeability (l/hm²bar) | MWCO (Da) |
|---|---|---|---|
| Native | 20 | 20 | 512 |
| MPA | 37 | 14 | 500 |
| PGR | 60 | 8 | 542 |
| MGR | 60 | 9 | 511 |
| PPA | 80 | low | — |
| HDPA | 124 | zero | — |

The CA values show that the produced grafted membranes cover a wide range of hydrophilicity depending on the grafting technique and the grafted functional group. The water contact angle values correlate with the water permeabilities, indicating that an increased hydrophobicity of the membrane generally leads to a lower water permeability. The PPA and HDPA membranes are most hydrophobic (highest CA), leading to a significantly reduced water permeability for the PPA membrane, and a water permeability of zero for the HDPA. For these membranes, the MWCO value was not measured, and no fouling experiments were performed.

For the other membranes, the MWCO values did not change significantly after the different modifications in comparison to unmodified membranes, indicating that no significant changes in pore size occurred.

Fouling Measurements

Fouling experiments were performed using model fouling solutions mimicking the fouling in surface and ground water treatment, and model fouling solutions mimicking the fouling in the treatment of effluents of pulp and paper industry.

Ground and surface water typically contain a number of common foulants, more particularly humic acids with inorganic salts (e.g. $Ca^{+2}$), proteins, peptides, amino acids, polysaccharides and transparent exopolymer particles (TEP). A number of synthetic compounds mimicking these foulants are commercially available.

The fouling tendency of the grafted membranes in comparison to the native membrane was determined by fouling measurements with the following model foulants:

humic acid in combination with different concentrations of $Ca^{2+}$ at different pH values, for mimicking natural organic material (NOM) or humic materials;

laminarin gum for mimicking TEP foulants; and meat peptone, as a model foulant for proteins.

A number of different aqueous solutions (foulant solutions) of these model foulants and concentrations were prepared for measuring the fouling tendency of modified membranes in comparison with unmodified membranes. Concentrations and pH values used mimic those of real ground and surface waters.

The same membranes were used for all three model foulants. In between the measurements with the different type of foulants, the fouled membranes were chemically cleaned (see further). The fouling of the membranes was assessed by determining the decline of the RO water flux values for each membrane, normalized to the RO water flux before fouling. The results of the fouling experiments are discussed herein below.

Fouling Using Humic Acid:

for the fouling experiments using humic acid, commercially available humic acid (HA) was used as the model foulant, in a concentration of 10 mg/L, in combination with 3 $Ca^{2+}$ concentrations (1, 2 and 4 mmol) and 2 pH levels (6, 5 and 9). It is known that inorganic ions, and in particular $Ca^{2+}$ can contribute to the adsorption of the organic matter to the membrane surface, and that a higher ionic strength of the solution has a positive effect on the adhesion of humic acids. The different conditions were applied subsequently, without intermediate cleaning of the membranes.

Figure 1A:
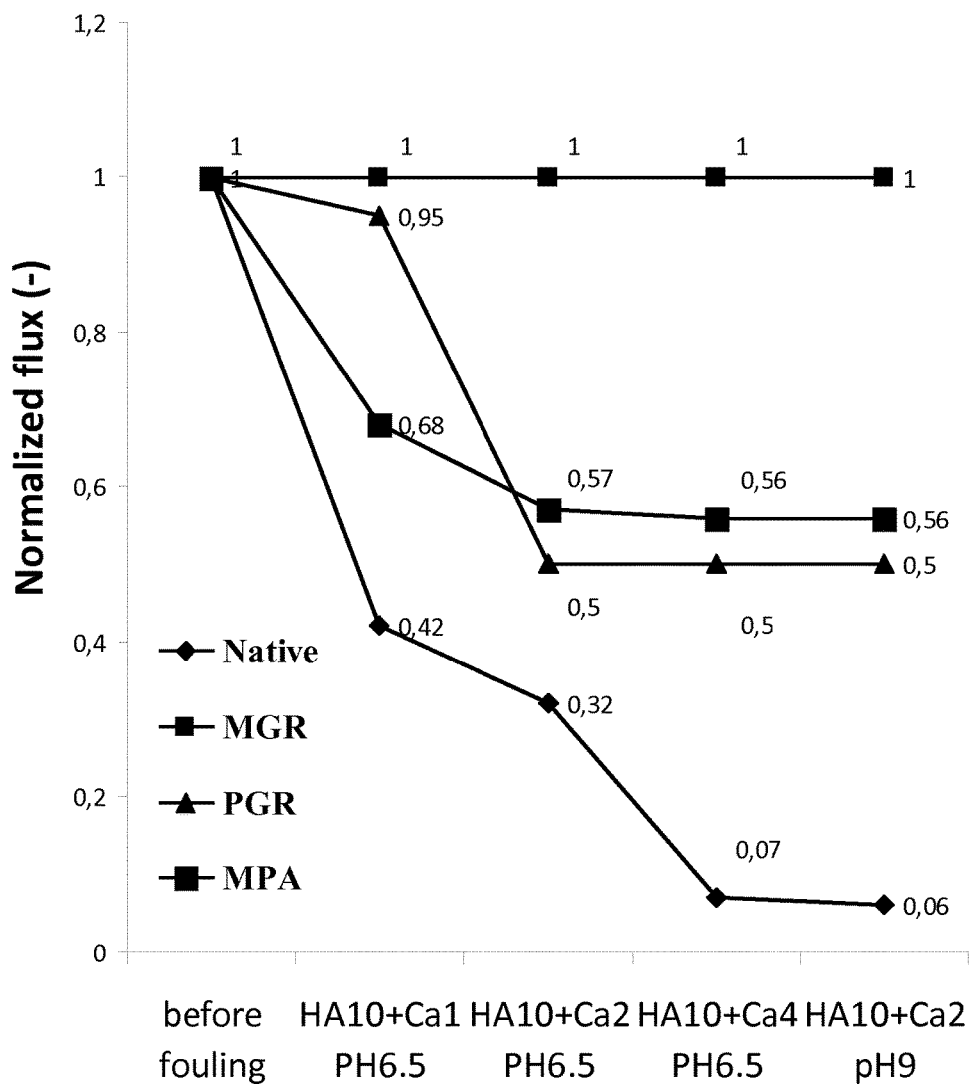
FIG. 1A: Graph illustrating the fouling tendency of grafted and native titania NF membranes using humic acid (HA) as a model foulant, in a concentration of 10 mg/L in combination with a $Ca^{2+}$ concentration of 1, 2 and 4 mmol/L at two pH levels.

The results of the experiments are shown in FIG. 1A, and show a clear water flux decline and thus irreversible fouling of the native membrane under all conditions. On the other hand, less fouling was observed with the MPA and PGR membranes, whereas no fouling at all was observed with the MGR membrane. The visual appearance of the membranes gave a similar indication of the degree of fouling Indeed, whereas the MGR membrane still had its original white color, the inside of the native membrane had a strong black color after the fouling measurements. Also the MPA and PGR membranes were colored due to fouling, but to a lesser extent than the native membrane.

Fouling Using Laminarin:

It is well known that surface water is more fouling in the season of algae bloom. In these periods, large and sticky transparent exopolymer particles (TEP) are formed predominantly by self-assembly of dissolved precursors, mostly dissolved polysaccharides released by microorganisms as algea, phytoplankton or bacterioplankton. Laminarin, a gum with a molecular size of ~30 kD, is an important part of TEPs, and is therefore used as a model foulant in this study. Laminarin concentrations in real water streams typically are in the range of (0-0.5) mg/l.

Figure 1B:
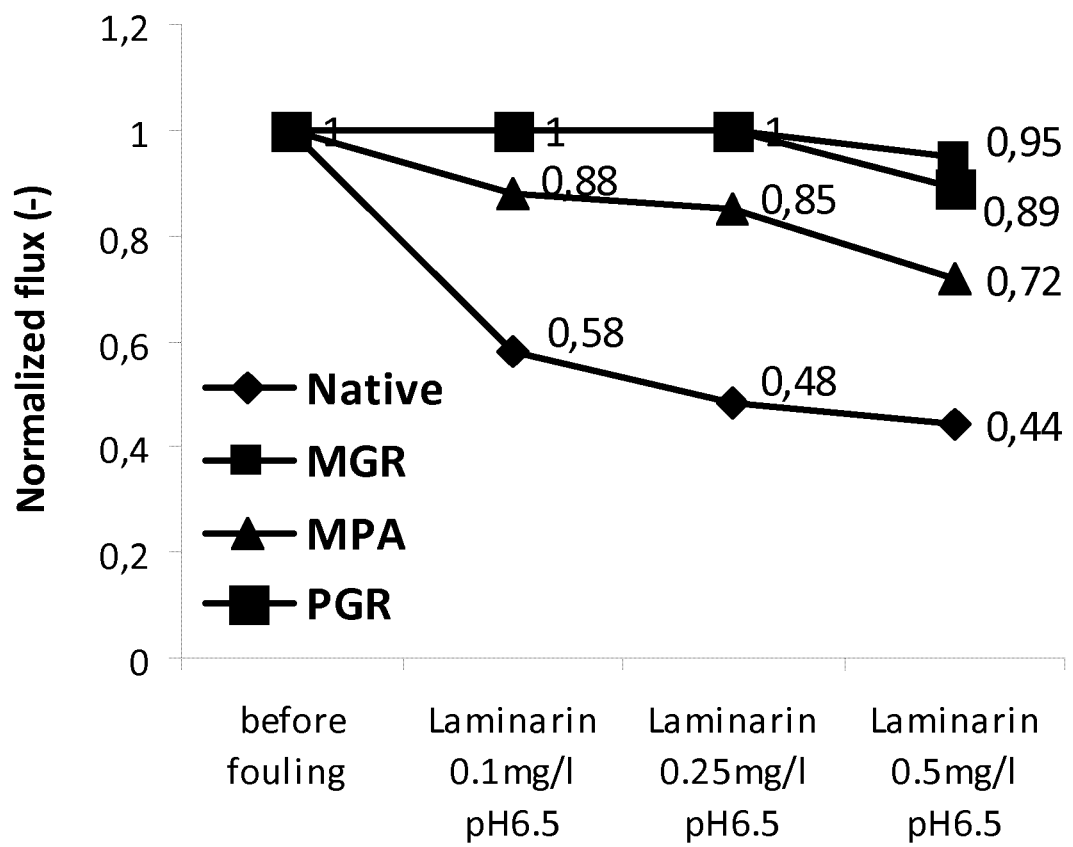

The results of the fouling experiments using laminarin are shown in FIG. 1B. Again, the native membrane is clearly fouled. The results of the PGR and the MGR membranes are similar to each other, and each show a significantly lower fouling compared to the native membrane. Also the fouling of the MPA membrane is low compared to the native membrane.

Fouling Using Meat Peptone:

Next to humic acids, proteins, polysaccharides, fatty acids and amino acids are the other main constituent of natural organic matter (NOM) in ground and surface waters causing membrane fouling. Commercial meat peptone, prepared by the enzymatic hydrolysis of selected animal tissues, contains these compounds and is therefore a suitable model foulant for these components. Again, concentrations were used which mimics real streams: 5, 15 and 25 mg/L.

Figure 1C:
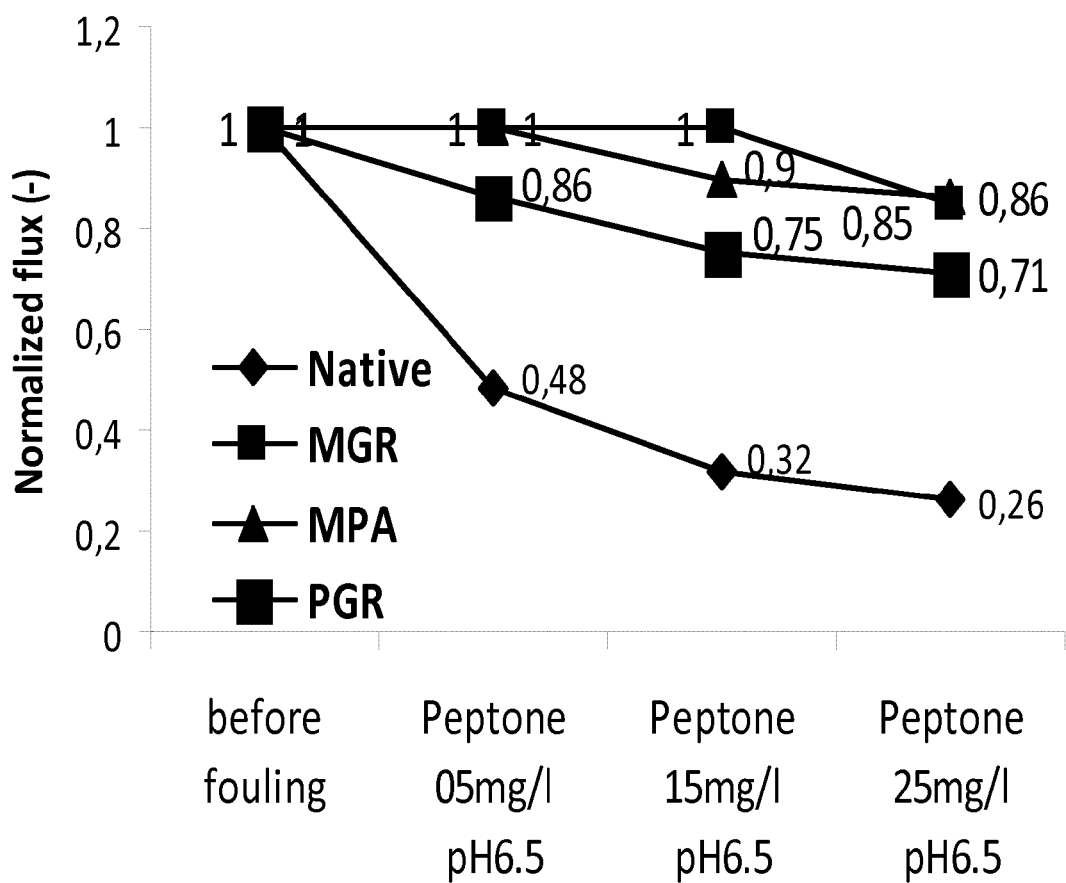

The results of the fouling experiments with meat peptone are shown in FIG. 1C, and confirm the positive effect of the grafting on the fouling behavior. Indeed, the MGR and MPA membrane again show a remarkably low fouling, whereas also the fouling of the PGR membrane is low compared to the native membrane.

Fouling Using Wood Extracts

Pulp and paper mill process waters or effluents typically comprise a complex mixture of wood compounds (lignin, hemicelluloses, and the like) and process chemicals (e.g. resin acids), which may have a polymeric, oligomeric, or monomeric nature.

A model solution to mimic the fouling tendency of pulp and paper mill process waters was prepared, based on a wood extract solution extracted from wood at a high temperature provided by the Lappeenranta University of Technology in Finland. The wood extract solution was evaporated and the resulting powder was used to make model solutions by diluting the powder into water at a concentration of 1.1 and 2.2 g/L. The pH of the model solutions was about 6.5. Such solutions comprise wood hemicelluloses and lignin at wide molar mass range and a minor amount of wood lipophilic extractives, and have shown a high fouling tendency for many polymeric membranes.

Figure 1D:
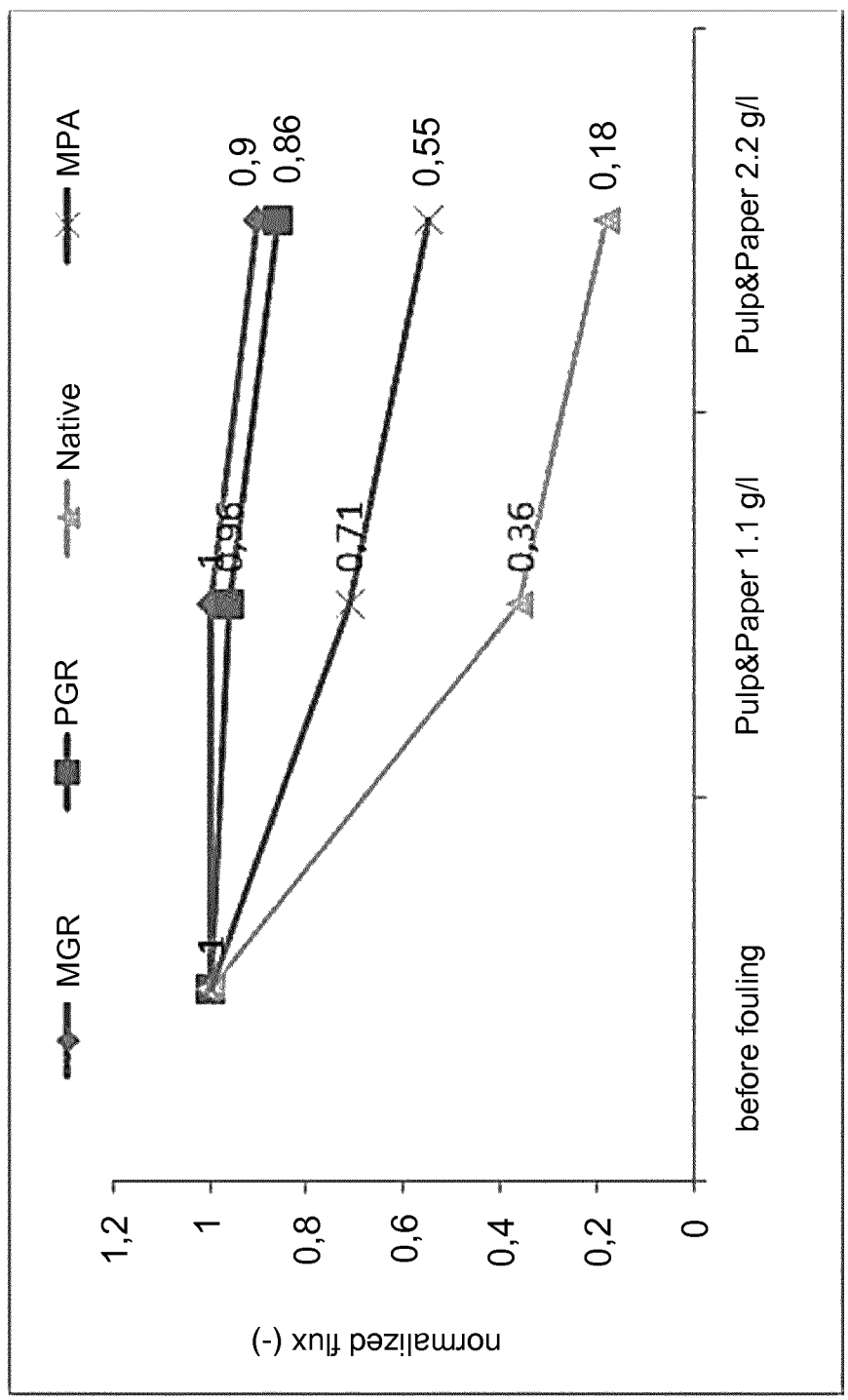

Three grafted membranes (MGR, PGR and MPA) were used in fouling measurements using these model solutions. The results of the fouling experiments are shown in table 2 and FIG. 1D and again show a positive effect of the grafting on the fouling behavior. More particularly, the MGR and PGR membrane show a remarkably low fouling, while the fouling of the MPA membrane is still significantly lower compared to the native membrane.

TABLE 2

|  | before fouling | Pulp&Paper 1.1 g/l | Pulp&Paper 2.2 g/l |
| --- | --- | --- | --- |
| MGR | 1 | 1 | 0.9 |
| PGR | 1 | 0.96 | 0.86 |
| Native | 1 | 0.36 | 0.18 |
| MPA | 1 | 0.71 | 0.55 |

Membrane Cleaning

In between the measurements with the different foulants, all fouled membranes were chemically cleaned with an alkaline cleaning agent. After cleaning, the RO water flux of the membranes was measured in order to evaluate the efficiency of the cleaning.

It was found that whereas all grafted membranes recovered completely under milder chemical cleaning conditions at a pH value of 10, the native membrane could not cleaned at pH10. Instead, the native membranes required relative harsh chemical cleaning conditions at a pH value of 12. The relative ease of cleaning of the grafted membranes indicates that the foulants have more or stronger interactions with the native membrane as compared to the grafted membranes, again showing that grafting of ceramic NF membranes diminishes their fouling behavior.

The results of the cleaning experiments also provide an indication of the excellent stability of the grafting and the strength of foulant-membrane interactions.

Conclusions

The above results clearly indicate that grafting of NF $TiO_2$ membranes via reaction of the membrane with phosphonic acids or organometallic reagents can decrease their fouling tendency. In particular grafting with methyl groups using the Grignard technique leads to membranes with an unparalleled low sensitivity to irreversible fouling.

Cleaning experiments showed that all graftings are stable in basic media up to pH 10 and allowed for a proper cleaning of the grafted membranes, thereby fully restoring their water flux and anti-fouling capacity. All obtained fouling results show that grafting results in vast fouling resistance, making it very interesting to enhance the commercial application potential of ceramic NF membranes for water treatment.

2. Fouling Prevention in Oil/Water Separation

A huge amount of waste water streams exist which are contaminated with oil. Currently, oil production is one of the biggest sources of oil-contaminated waste water.

Nevertheless, also several other industrial sectors produce such effluents.

Open ultrafiltration membranes (having pore sizes from 20 to 200 nm) offer a good separation option for the treatment of oil-contaminated water. Unfortunately, membrane fouling is a serious issue.

The present inventors have performed tests to evaluate the antifouling properties of the membranes described herein, when used for oil contaminated water treatment. The tests were performed on a model oil/water emulsion mimicking real oil-contaminated water resulting from oil production and other oil-containing (waste) water streams.

For these tests three commercially available $TiO_2$ membranes (obtainable from Inopor, Germany) with a pore size of 30 nm were used. A first $TiO_2$ membrane was grafted with methyl groups using Grignard grafting (see section 1.A above) and a second $TiO_2$ membrane was grafted with methyl groups using phosphonic acid grafting (see section 1.A above). The third $TiO_2$ membrane was not grafted and was used as a control.

Fouling tests were performed with all three membranes to determine the irreversible fouling. The fouling tests were similar to the tests as described above for Example 1 (here performed at 1 bar instead of at 5 bar), but with the use of different oil/water model emulsions as foulant solutions.

When comparing the membrane flow at the beginning and the end of the tests, the ungrafted $TiO_2$ membranes showed a flow reduction of more than 50% due to irreversible fouling, whereas the flow reduction for the grafted $TiO_2$ membranes was less than 10%. This indicates that the grafted membranes are significantly less sensitive to irreversible fouling.

This example clearly shows that the grafted membranes described herein also provide antifouling properties when using the membranes for the treatment of oil contaminated water. The results further show that the present methods are not limited to porous membranes having a pore diameter of about 1 nm as described in Example 1, but are also useful for much opener membranes.

What is claimed is:

1. An antifouling treatment method of a hydrophilic membrane comprising an oxide and/or hydroxide of silicon or a metal, comprising grafting a surface of the membrane comprising said oxide and/or hydroxide with an organic moiety $R^1$ or $R^{10}$ by contacting said surface with an organometallic reagent, a phosphonate, a phosphinate, or an organosilane to obtain a treated membrane which is at least in part hydrophilic, wherein $R^1$ is selected from the group consisting of $C_{1-12}$alkyl, $C_{6-10}$aryl, $C_{7-16}$alkylaryl, $C_{7-16}$arylalkyl, —$R^7[OR^8]_nR^9$, $C_{3-8}$cycloalkyl, $C_{3-8}$cycloalkenyl, $C_{4-10}$cycloalkylalkyl, $C_{4-10}$cycloalkenylalkyl, $C_{2-12}$alkenyl, 3- to 8-membered heterocyclyl, 5- to 10-membered heteroaryl, heterocyclyl$C_{1-6}$alkyl, heteroaryl$C_{1-4}$alkyl and $C_{2-12}$alkynyl; wherein $R^7$ and $R^8$ are independently from each other $C_{1-4}$alkylene; n is an integer from 1 to 4; and $R^9$ is $C_{1-4}$ alkyl; and $R^{10}$ is selected from the group consisting of $C_{1-8}$ alkylene, $C_{6-10}$arylene, $C_{7-16}$alkylarylene, $C_{7-16}$arylalkylene, —$R^{11}[OR^{12}]_mR^{13}$—, $C_{3-8}$cycloalkylene, $C_{3-8}$cycloalkenylene, $C_{4-10}$cycloalkylalkylene, $C_{4-10}$cycloalkenylalkylene, $C_{2-12}$alkenylene, 3- to 8-membered heterocyclylene, 5- to 10-membered heteroarylene, heterocyclyl$C_{1-6}$alkylene, heteroaryl$C_{1-4}$alkylene and $C_{2-12}$alkynylene; wherein $R^{11}$, $R^{12}$, and $R^{13}$ are independently from each other $C_{1-4}$alkylene, and m is an integer from 1 to 4;

wherein $R^1$ and $R^{10}$ are optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1-6}$alkyl, halo and $C_{6-10}$aryl, and wherein the treated membrane has a ratio of water permeability compared to a same non-treated membrane of at least 8/20.

2. The method according to claim 1, wherein said membrane comprises an oxide and/or hydroxide of an element $M^1$, and said surface of said membrane is grafted with an organic functional group $R^1$, via a direct $M^1$-$R^1$ bond;
at least one $M^1$-O—P—$R^1$ bond;
a $M^1$-O—Si—$R^1$ bond;
a $M^1$-O—P—$R^{10}$—P—O-$M^1$ bond; or
a $M^1$-O—Si—$R^{10}$—Si—O-$M^1$ bond;
wherein
$M^1$ is a metal or silicon; and $R^1$ and $R^{10}$ have the same meaning as defined in claim 1.

3. The method according to claim 1, wherein said organometallic reagent is a compound of the formula $R^1$-$M^2$, or of formula $R^1$-$M^2$-X, or of formula $R^1$-$M^2$-$R^{1'}$; wherein $M^2$ is Li or Mg, and X is halo;
$R^1$ has the same meaning as in claim 1; and
$R^{1'}$ is, the same or different from $R^1$, selected from the group consisting of $C_{1-12}$alkyl, $C_{6-10}$aryl, $C_{7-16}$alkylaryl, $C_{7-16}$arylalkyl, —$R^7[OR^8]_nR^9$, $C_{3-8}$cycloalkyl, $C_{3-8}$cycloalkenyl, $C_{4-10}$cycloalkylalkyl, $C_{4-10}$cycloalkenylalkyl, $C_{2-12}$alkenyl, 3- to 8-membered heterocyclyl, 5- to 10-membered heteroaryl, heterocyclyl$C_{1-6}$alkyl, heteroaryl$C_{1-4}$alkyl and $C_{2-12}$alkynyl; optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1-6}$alkyl, halo and $C_{6-10}$aryl;
$R^7$ and $R^8$ are independently from each other $C_{1-4}$alkylene;
n is an integer from 1 to 4; and
$R^9$ is $C_{1-4}$ alkyl.

4. The method according to claim 1, wherein said phosphonate or phosphinate is a compound chosen from formula (I)

(I)

or a salt or ester thereof, wherein $R^1$ has the same meaning as in claim 1;
or
formula (III)

(III)

or a salt or ester thereof, wherein
$R^1$ has the same meaning as in claim 1; and
$R^{1'}$ is, the same or different from $R^1$, selected from the group consisting of $C_{1-12}$alkyl, $C_{6-10}$aryl, $C_{7-16}$alkylaryl, $C_{7-16}$arylalkyl, —$R^7[OR^8]_nR^9$, $C_{3-8}$cycloalkyl, $C_{3-8}$cycloalkenyl, $C_{4-10}$cycloalkylalkyl, $C_{4-10}$cycloalkenylalkyl, $C_{2-12}$alkenyl, 3- to 8-membered heterocyclyl, 5- to 10-membered heteroaryl, heterocyclyl $C_{1-6}$alkyl, heteroaryl$C_{1-4}$alkyl and $C_{2-12}$alkynyl; optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1-6}$alkyl, halo and $C_{6-10}$aryl;

$R^7$ and $R^8$ are independently from each other $C_{1-4}$alkylene;

n is an integer from 1 to 4; and $R^9$ is $C_{1-4}$ alkyl;

or formula (IV)

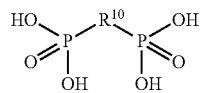

or a salt or ester thereof, wherein $R^{10}$ has the same meaning as in claim 1.

5. The method according to claim 1, wherein $R^1$ is $C_{1-6}$alkyl, phenyl, or —$R^7[OR^8]_nR^9$; wherein $R^7$ and $R^8$ are independently from each other $C_{1-4}$alkylene;

n is an integer from 1 to 4; and $R^9$ is $C_{1-4}$ alkyl.

6. The method according to claim 1, for protecting said membrane against fouling when used for water treatment.

7. The method according to claim 1, wherein $R^1$ is $C_{1-6}$alkyl or phenyl; and $R^{10}$ is $C_{1-6}$alkylene or phenylene.

8. A method for the purification of an aqueous composition comprising the steps of (i) providing a functionalized at least in part hydrophilic inorganic matrix comprising an oxide and/or hydroxide of an element $M^1$, wherein a surface of said inorganic matrix is grafted with an organic functional group $R^1$ or $R^{10}$, wherein, $M^1$ is a metal or silicon;

$R^1$ is selected from the group consisting of $C_{1-12}$alkyl, $C_{6-10}$aryl, $C_{7-16}$alkylaryl, $C_{7-16}$arylalkyl, —$R^7[OR^8]_nR^9$, $C_{3-8}$cycloalkyl, $C_{3-8}$cycloalkenyl, $C_{4-10}$cycloalkylalkyl, $C_{4-10}$cycloalkenylalkyl, $C_{2-12}$alkenyl, 3- to 8-membered heterocyclyl, 5- to 10-membered heteroaryl, heterocyclyl$C_{1-6}$alkyl, heteroaryl$C_{1-4}$alkyl and $C_{2-12}$alkynyl; wherein $R^7$ and $R^8$ are independently from each other $C_{1-4}$alkylene; n is an integer from 1 to 4; and $R^9$ is $C_{1-4}$ alkyl;

and $R^{10}$ is selected from the group consisting of $C_{1-8}$ alkylene, $C_{6-10}$arylene, $C_{7-6}$alkylarylene, $C_{7-16}$arylalkylene, —$R^{11}[OR^{12}]_mR^{13}$—, $C_{3-8}$cycloalkylene, $C_{3-8}$cycloalkenylene, $C_{4-10}$cycloalkylalkylene, $C_{4-10}$cycloalkenylalkylene, $C_{2-12}$alkenylene, 3- to 8-membered heterocyclylene, 5- to 10-membered heteroarylene, heterocyclyl$C_{1-6}$alkylene, heteroaryl$C_{1-4}$alkylene and $C_{2-12}$alkynylene; wherein $R^{11}$, $R^{12}$, and $R^{13}$ are independently from each other $C_{1-4}$alkylene;

wherein $R^1$ and $R^{10}$ are optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1-6}$alkyl, halo and $C_{6-10}$aryl, and m is an integer from 1 to 4; and wherein the treated membrane has a ratio of water permeability compared to a same non-treated membrane of at least 8/20; and (ii) filtering said aqueous composition with said functionalized inorganic matrix to obtain a purified aqueous composition.

9. The method according to claim 8, wherein $R^1$ or $R^{10}$ is grafted on said surface via a direct $M^1$-$R^1$ bond;

at least one $M^1$-O—P—$R^1$ bond;

a $M^1$-O—Si—$R^1$ bond;

a $M^1$-O—P—$R^{10}$—P—O-$M^1$ bond; or a $M^1$-O—Si—$R^{10}$—Si—O-$M^1$ bond.

10. The method according to claim 8, wherein, $M^1$ is selected from the group consisting of titanium, zirconium, aluminium, silicon, strontium, yttrium, lanthanum, hafnium, thorium, iron, manganese, or combinations thereof.

11. The method according to claim 8, wherein the oxide and/or hydroxide of $M^1$ is titanium oxide or zirconium oxide.

12. The method according to claim 8, wherein $R^1$ is $C_{1-6}$alkyl, phenyl, or $R^7[OR^8]_nR^9$; optionally substituted with one or more groups independently selected from hydroxyl, —$OR^4$, amino, halo, sulfhydryl, —$SR^5$, —COOH, and —$COOR^6$; wherein $R^4$, $R^5$, $R^6$ are independently selected from $C_{1-6}$alkyl, halo and $C_{6-10}$aryl;

$R^7$ and $R^8$ are independently from each other $C_{1-4}$alkylene; and n is an integer from 1 to 4.

13. The method according to claim 8, wherein said functionalized inorganic matrix is a membrane comprising a support made of inorganic material coated with at least one separating membrane layer made of the oxide and/or hydroxide of $M^1$ at the surface.

14. The method according to claim 8, for the purification of an aqueous composition comprising at least 70 wt % water.

15. The method according to claim 13, wherein the membrane is a porous membrane with an average pore size of 0.5 nm to 200 nm.

16. The method of claim 1, wherein the water permeability is measured using deionized water in a cross flow system, with a flow velocity of 2 m/s, and a trans membrane pressure of 5 bar.

17. The method of claim 8, wherein the water permeability is measured using deionized water in a cross flow system, with a flow velocity of 2 m/s, and a trans membrane pressure of 5 bar.

* * * * *